United States Patent
Kondapalli et al.

(10) Patent No.: US 9,467,568 B1
(45) Date of Patent: Oct. 11, 2016

(54) DISTRIBUTED AUDIO CONFERENCING SYSTEM

(71) Applicant: ShoreTel, Inc., Sunnyvale, CA (US)

(72) Inventors: Chakradhar Kondapalli, Austin, TX (US); Pramod Madabhushi, Austin, TX (US)

(73) Assignee: ShoreTel, Inc., Sunnyvale, CA (US)

( * ) Notice: Subject to any disclaimer, the term of this patent is extended or adjusted under 35 U.S.C. 154(b) by 0 days.

(21) Appl. No.: 14/334,650

(22) Filed: Jul. 17, 2014

Related U.S. Application Data

(63) Continuation of application No. 12/571,054, filed on Sep. 30, 2009, now Pat. No. 8,804,577.

(51) Int. Cl.
*H04M 3/56* (2006.01)
*H04M 1/253* (2006.01)

(52) U.S. Cl.
CPC ........... *H04M 3/561* (2013.01); *H04M 1/2535* (2013.01)

(58) Field of Classification Search
CPC ........... H04L 12/1822; H04L 12/5695; H04L 65/608; H04L 41/046; H04L 41/06; H04L 41/0896; H04L 41/5012; H04L 41/5019; H04L 41/5087; H04L 47/20; H04L 47/24; H04L 47/724; H04L 47/745; H04L 47/748; H04L 47/765; H04L 47/782; H04L 65/80; H04L 65/1069; H04L 29/06027; H04M 3/2227; H04M 3/428; H04M 3/54; H04M 3/56; H04M 7/1275
See application file for complete search history.

(56) References Cited

U.S. PATENT DOCUMENTS

| | | | |
|---|---|---|---|
| 6,393,275 B1* | 5/2002 | Alfred | 455/422.1 |
| 6,591,115 B1* | 7/2003 | Chow et al. | 455/555 |
| 6,606,493 B1* | 8/2003 | Chow et al. | 455/414.1 |
| 6,768,722 B1* | 7/2004 | Katseff et al. | 370/260 |
| 7,298,834 B1* | 11/2007 | Homeier et al. | 379/202.01 |
| 8,804,577 B1* | 8/2014 | Kondapalli et al. | 370/261 |
| 2004/0008635 A1* | 1/2004 | Nelson et al. | 370/260 |
| 2004/0202306 A1* | 10/2004 | Brotman et al. | 379/265.01 |
| 2004/0236830 A1 | 11/2004 | Nelson et al. | |
| 2005/0058125 A1 | 3/2005 | Mutikainen et al. | |
| 2005/0264648 A1 | 12/2005 | Ivashin et al. | |
| 2006/0268824 A1* | 11/2006 | Dhesikan et al. | 370/351 |
| 2007/0115919 A1 | 5/2007 | Chahal et al. | |
| 2007/0263824 A1 | 11/2007 | Bangalore et al. | |
| 2007/0280464 A1 | 12/2007 | Hughes et al. | |
| 2008/0098295 A1 | 4/2008 | Nelson et al. | |
| 2008/0232277 A1* | 9/2008 | Foo et al. | 370/260 |
| 2009/0204716 A1 | 8/2009 | Srinivasan et al. | |
| 2009/0316932 A1 | 12/2009 | Campion | |
| 2010/0165889 A1 | 7/2010 | Madabhushi et al. | |
| 2010/0191799 A1 | 7/2010 | Fiedorowicz et al. | |

* cited by examiner

*Primary Examiner* — Yee Lam
(74) *Attorney, Agent, or Firm* — Tarolli, Sundheim, Covell & Tummino LLP

(57) ABSTRACT

A conference call system with a plurality of endpoints, a switch and a media mixer is disclosed. One or more entities in the conference call system comprise part or whole of a feature module. The feature module executes various telephony features like adjusting the volume of a selected participant in a conference call, initiating a sidebar with a participant wherein other participants cannot hear the conversation of the participants in the sidebar, putting a selected call participant on hold from an endpoint other than the selected participant's endpoint, disconnecting a selected participant from an endpoint other than the selected participant's endpoint and transferring a call with two or more participants to a new participant's endpoint.

19 Claims, 17 Drawing Sheets

DISTRIBUTED AUDIO CONFERENCING SYSTEM

CROSS-REFERENCE TO RELATED APPLICATIONS

This application is a continuation of and claims priority under 35 U.S.C. §120 to U.S. application Ser. No. 12/571,054, filed Sep. 30, 2009, titled "Distributed Audio Conferencing System" which is incorporated by reference in its entirety.

BACKGROUND OF THE INVENTION

1. Field of the Invention

This invention relates to systems and methods for supporting telephony features on a Voice over Internet Protocol (VoIP) network. In particular, the present invention relates to a third party's participation in a telephone call.

2. Description of the Background Art

A call agent receives a call from a client and addresses a client's concerns. If the call agent during the call requires guidance from a supervisor, the call agent puts the client on hold, dials a supervisor's number, updates the supervisor regarding the client's concerns, determines the course of action with the supervisor, disconnects the supervisor's call and then engages the client again.

Alternatively, the supervisor is in a conference call with the call agent and the supervisor directs the call agent as the client listens in on the conversation between the supervisor and the call agent. The supervisor or the call agent does not have the choice to mute just the client out of the conference call as the supervisor and the call agent discuss the client's concerns.

Moreover, if the call agent determines to transfer the client's call to another call agent, the call agent cannot transfer the conference call with the supervisor and the client on the call. The new call agent has to be somehow informed about the conference call, the new call agent can then join the conference call and the original call agent can disconnect from the conference call. Alternatively, the supervisor can disconnect from the call and the client can be transferred to the new agent and the supervisor can then conference into the call.

Additionally, the call agent listening to both the supervisor and the client does not have the choice to adjust the supervisor's or the client's volume separately. The call agent either has to increase the volume for both or decrease the volume for both. The call agent does not have the choice to lower the supervisor's volume and pay more attention to client when both the client and supervisor are participating in a conversation.

SUMMARY OF THE INVENTION

A conference call system comprises a plurality of endpoints, a switch and a media mixer. One or more of these entities comprises a whole or a part of a feature module. The feature module is configured to execute various telephony features for a conference call.

A feature module comprises a volume module, a sidebar module, a third party hold module, a supervisor hunt module, a third party disconnect module and a transfer module. The volume module is configured to receive an identification of a selected call participant and adjust the volume of the selected call participant. In one embodiment, the volume module is configured to determine the media mixer for the conference call and request the media mixer to adjust the volume of the selected call participant.

The sidebar module is configured to receive a sidebar request from an agent's endpoint for a sidebar between the agent's endpoint and a supervisor' endpoint while the agent's endpoint is connected to a client's endpoint. Responsive to receiving the sidebar request, the sidebar module is configured to determine a media mixer for the call and request the media mixer to create a media connection with the supervisor's endpoint. The sidebar module is also configured to request the media mixer to mute voice transmission from the agent's endpoint and the supervisor's endpoint to the client's endpoint.

The third party hold (TPH) module is configured to receive a request from a requesting endpoint to put a selected endpoint on hold. As a result of this hold, participating endpoints other than the selected endpoint still exchange media with each other but the selected endpoint does not. In one embodiment, the TPH module is configured to receive a TPH request, determine the media mixer for the call and request the media mixer to mix media from endpoints of call participants other than the selected participant. Additionally, the TPH module is configured to request the media mixer to suspend transmitting the mixed media to the selected endpoint.

The supervisor hunt module is configured to receive a request for a supervisor from an agent's endpoint or a requesting module in the agent's endpoint. In one embodiment, the request also includes a description tag describing a search criterion for the requested supervisor. The supervisor hunt module is configured to query a supervisor database based on the agent's identification and optionally received description tag. Additionally, the supervisor hunt module is configured to transmit to the agent's endpoint or the requesting module the results of the query. In one embodiment, the results of the query include an identification of the supervisor associated with the agent. In another embodiment, the results of the query include an error indicating that a supervisor was not found.

The third party disconnect (TPD) module is configured to receive a request from a first participant's endpoint to disconnect a second participant's endpoint from a conference call. The TPD module is configured to receive the TPD request, determine the media mixer for the call, and transmit a request to the media mixer. The transmitted request directs the media mixer to delete media connections to and from the second participant's endpoint. In one embodiment, the TPD module is also configured to determine if the first participant has the required permission to request a second participant's disconnection. If the first participant does not have the required permission, the TPD module is configured to transmit a "request denied" message to the first participant's endpoint.

The transfer module is configured to receive a request from a first participant's endpoint to transfer a call including a second participant and a third participant to a fourth participant's endpoint. The transfer module is configured to receive the transfer request, determine the media mixer for the call and transmit a transfer request to the media mixer. The transmitted request directs the media mixer to create media connections with the fourth participant's endpoint and delete media connections with the first participant's endpoint. Additionally, the transfer module is configured to determine if the first participant's endpoint is also the media mixer for the call. If yes, the transfer module is configured to transmit a request to the fourth participant's endpoint to function as the media mixer for the call.

BRIEF DESCRIPTION OF THE DRAWINGS

The invention is illustrated by way of example, and not by way of limitation in the figures of the accompanying drawings.

Figure 1:
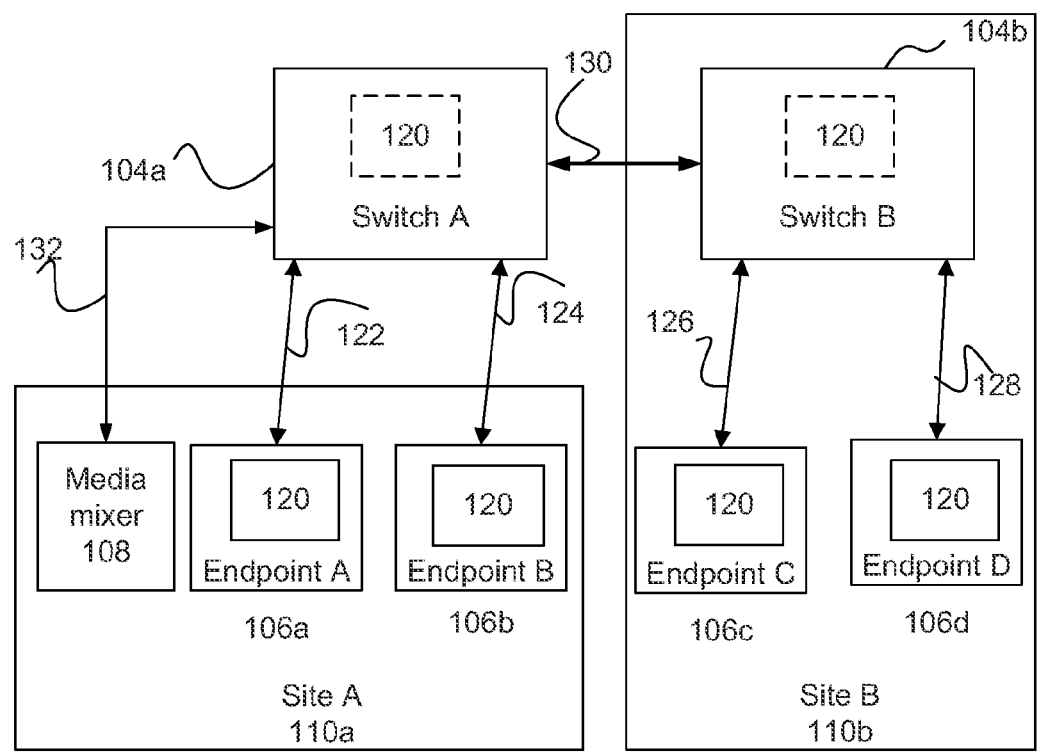
FIG. 1 is a block diagram illustrating a distributed conferencing system according to one embodiment of the present invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Distributed audio conferencing systems and methods for monitoring a call are described. A client calls a call agent to discuss an issue and the call agent decides to consult a supervisor for the client's concerns. The call agent through the phone searches for a supervisor with expertise in the area of client's concern. If a supervisor with the expertise is not found, the call agent is so informed and the call agent can then search for a supervisor based on a different search criterion like years of experience or association with a particular group in the organization. If the supervisor is found, the supervisor in connected to the call and the call agent can discuss the client's concerns on the call.

After the supervisor is associated with the call, the call agent has the option to put the client on hold such that the call agent and supervisor can still talk to each other on the call but the client cannot hear their conversation. The call agent can then remove the client from hold and converse with the client as the call agent and supervisor listen to the client. The call agent and the supervisor also have the option of selecting one of the call participants and individually increasing or decreasing the selected participant's volume. As a result, the supervisor or the call agent can hear one participant at a higher volume than the other in the same call.

If during the call, the call agent determines that the client should be transferred to a new call agent and the supervisor decides to stay on the call, the call agent can transfer the call with the supervisor and the client still on the call to a new call agent. The supervisor need not disconnect from the call before the transfer to the new call agent.

Additionally, if the supervisor or the agent determines that one of the participants should be disconnected from the call, the supervisor or the agent has the option of disconnecting the other participant from the call. In one embodiment, the authority to disconnect another participant from the call is controlled by assigning different levels of permissions to different personnel in the organization.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the telecommunication arts to most effectively convey the substance of their work to others skilled in the art. An algorithm is here, and generally, conceived to be a self-consistent sequence of steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose computing systems including a processor, memory, non-volatile storage, input device and output device may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the invention may be further divided into logical modules. One of ordinary skill in the art will understand that these modules can be implemented in hardware, firmware and/or software. In one embodiment, the modules are implemented in form of computer instructions stored in a computer readable storage medium when executed by a processor cause the processor to implement the functionality of the module. Additionally, one of ordinary skill in the art will recognize that a computer or another machine with instructions to implement the functionality of one or more logical modules is not a general purpose computer. Instead, the machine is adapted to implement the functionality of a particular module. Moreover, the machine embodiment of the invention physically transforms the electrons representing various user requests, media or other tangible objects from one state to another in order to attain the desired result.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Conferencing System Example

Referring now to FIG. 1, a conference system 100 comprises a site A 110*a*, a site B 110*b* and a switch A 104*a*. In one embodiment, the conference system 100 comprises only one site 110 and in another embodiment, the conference system 100 comprises more than two sites 110.

Switch A 104*a* is an electronic switch, a digital switch, a soft switch or any other switch used to route phone calls. In one embodiment switch A 104*a* includes the functionality of a media mixer and therefore receives the media data from various call participants, mixes the media data, and transmits the mixed data to call participants. In another embodiment, switch A 104*a* includes a feature module 120 that executes various telephony features as described below. Alternatively, the feature module 120 is partly or wholly present in switch A 104*a* and endpoints 106. The switch A 104*a* is communicatively coupled to endpoints 106*a-b* in site A 110*a* through communication buses 122-124. Switch A is also communicatively coupled to media mixer 108 in site A 110*a* through communication bus 132 and to switch B 104*b* in site B 110*b* through communication bus 130. Communication buses 122-124 and 132-134 are communication channels used in the art to receive and/or transmit electronic signals.

Site A 110*a* is a logical grouping of various network entities. As used herein, a site represents a grouping of resources. One skilled in the art will note that sites 110*a*, 1110*b* can be physically distinct from each other or merely topology-related groupings that are not in physically distinct locations. Additionally, the conference system 100 architecture can be expanded to numerous sites and is not limited to only two sites. Site A 110*a* comprises a media mixer 108 and endpoints 106*a-b*.

Media mixer 108 is a module that receives media from one or more endpoints 106, mixes the received media and transmits the mixed media to one or more endpoints 106. The participating endpoints 106 receive the mixed media and render the mixed media for their respective callers. In one embodiment, one or more endpoints 106 also serve as media mixers 108 for one or more other endpoints 106 participating in a conference call. In another embodiment, one or more switches 104 serve as media mixers 108 for one or more endpoints 106 participating in a call. In yet another embodiment, each participating endpoint 106 serves as its own media mixer 108. In this embodiment, the participating endpoint 106 receives media from other participating endpoints 106, mixes the received media and renders it for the caller operating the endpoint 106.

An endpoint enables a user to carry on a phone call. Although in the illustrated embodiment the first site 110*a* has two endpoints 106*a-b*, in other embodiments the first site 110*a* has different numbers and types of endpoints. Examples of endpoints include a video conferencing device, a multipoint control unit (MCU), a conference bridge, an analog terminal adapter (ATA), a computing device configured to execute the functionality of an endpoint, and any other device that originates and/or terminates a media stream.

In one embodiment, endpoints 106 include a feature module 120 that implements various features like volume control, sidebar, third party hold, supervisor hunt and third party disconnect described below. The feature module is described in detail in FIG. 2.

At site B, telephones 106*c-d* are communicatively coupled to switch B 104*b* through communication buses 126, 128 respectively. Switch B 104*b* is communicatively coupled to the endpoints 106*c-d* and switch A 104*a*. As apparent from FIG. 1, telephones 106 may (as in Site A) or may not (as in Site B) be in the same site as switch A or B. The conferencing system of FIG. 1 also has other conventional VoIP system components (not shown) such as an MGCP gateway.

Feature Module

Figure 2:
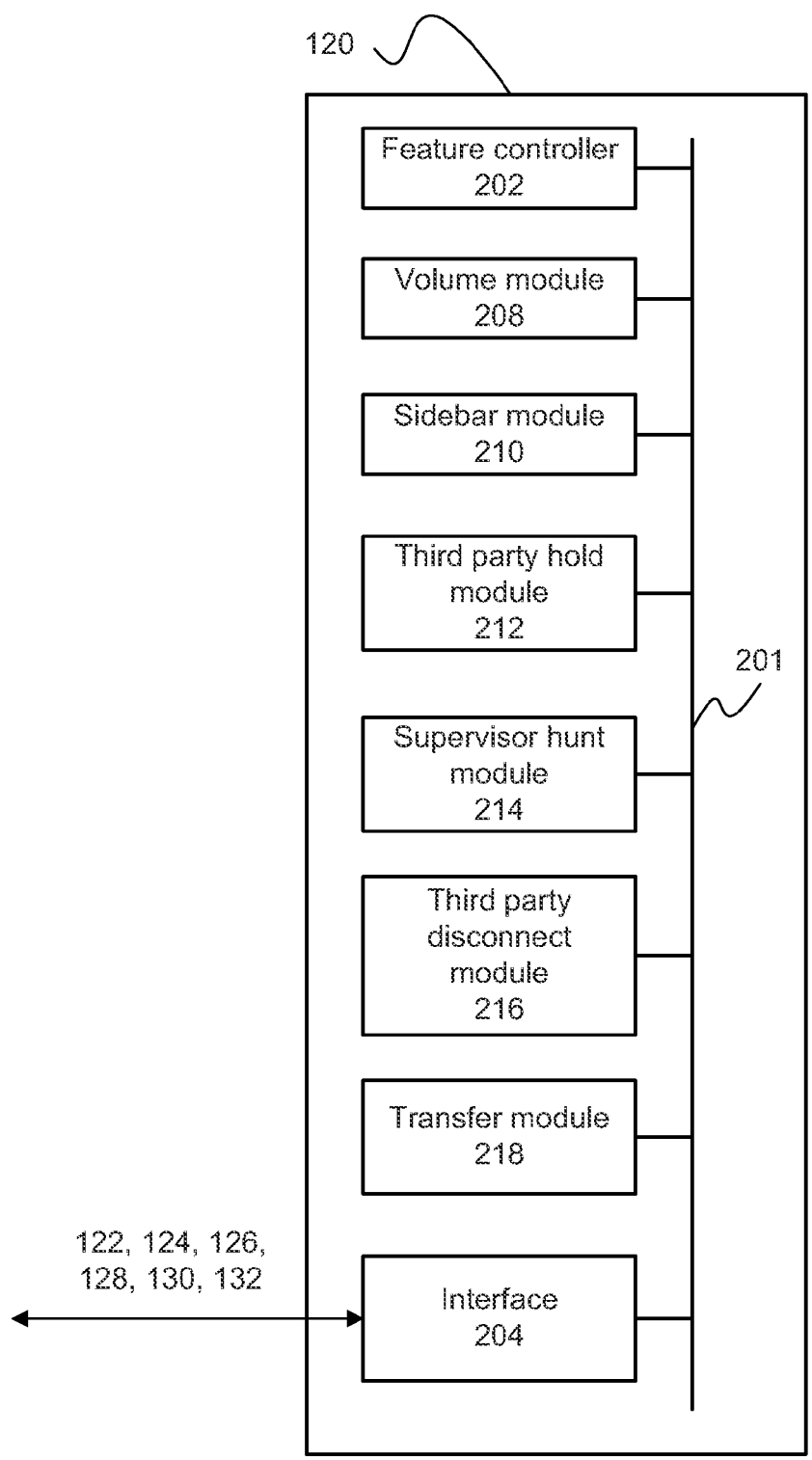
FIG. 2 is a block diagram illustrating a feature module according to one embodiment of the invention.

FIG. 2 is a block diagram illustrating a feature module 120 according to one embodiment of the invention. The feature module 120 implements various telephony features for the entity that includes feature module 120. The feature module 120 comprises a feature controller 202, a volume module 208, a sidebar module 210, a third party hold module 212, a supervisor hunt module 214, a third party disconnect module 216, a transfer module 218 and an interface 204. The above mentioned modules are communicatively coupled to each other through a communications bus 201. The communication bus 201 is a communication channel used in the art to transmit and receive electronic signals.

The feature controller 202 is configured to direct other modules in feature module 120 to execute their tasks at appropriate time. The volume module 208 is configured to control the volume of a selected participant in the call. The volume module 208 is described in further detail in FIG. 3A and FIG. 4.

The sidebar module 210 is configured to execute the sidebar feature wherein a call agent while servicing a client call can initiate a side call with a supervisor regarding the client's concerns. During the sidebar call, both the agent and the supervisor can hear the client but the client cannot hear the conversation between the agent and the supervisor. The sidebar module 210 is described in further detail in FIG. 3B and FIG. 5.

The third party hold (TPH) module 212 is configured to execute the third party hold feature wherein one participant in the call can put another call participant on hold such that the held call participant cannot hear other participants and the other participants cannot hear the held participant. The third party hold module 212 is described in further detail in FIG. 3C and FIG. 6.

The supervisor hunt module 214 is configured to search for a supervisor on receiving a request for a supervisor. The search is based on received or default criteria. The supervisor hunt module 214 is described in further detail in FIG. 3D and FIG. 7.

The third party disconnection (TPD) module 216 is configured to execute the third party disconnect feature wherein a call participant with appropriate permissions can disconnect another call participant from the call. The TPD module 216 is described in further detail in FIG. 3F and FIG. 8.

The transfer module 218 is configured to execute the transfer feature wherein a first call participant can transfer a call with two other participants to a fourth call participant. The transfer module 218 is described in further detail in FIG. 3G and FIG. 9.

The interface module 204 is configured to communicate with the modules in feature module 120 and other entities in conference system 100. The interface module 204 therefore receives electronic signals from one or more modules in feature module 120, formats the signals in appropriate format, and transmits the signals to the receiving entity in system 100.

Figures 3A, 3B:
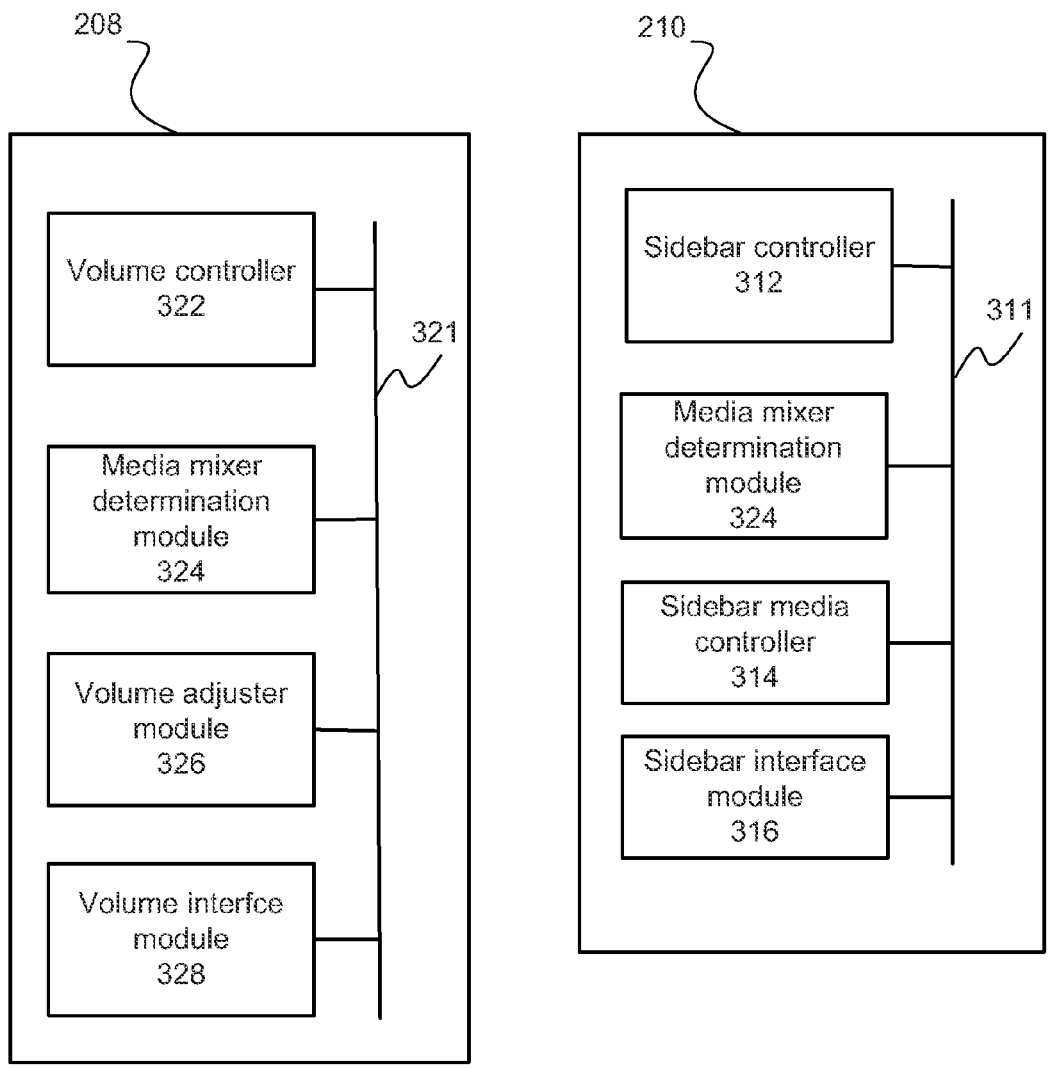
FIG. 3A is a block diagram illustrating a volume module according to one embodiment of the invention.
FIG. 3B is a block diagram illustrating a sidebar module according to one embodiment of the invention.

FIG. 3A is a block diagram illustrating a volume module 208 according to one embodiment of the invention. The volume module 208 comprises a volume controller 322, a media mixer determination module 324, a volume adjuster module 326 and a volume interface module 328. These modules are communicatively coupled to each other through a communication bus 321. The communication bus 321 is a communication channel used in the art to transmit and receive electronic signals.

The volume controller 322 directs other modules in volume module 208 to execute their respective tasks at appropriate times.

The media mixer determination module 324 determines the media mixer 108 for a particular call. In one embodiment, the media mixer determination module 324 queries a configuration file (not shown) to determine the media mixer 108 for a particular endpoint 106. In another embodiment, media mixer 108 is dynamically chosen for a call. The dynamically chosen media mixer 108 then broadcasts a message to various participating endpoints 106 and/or switches 104. The broadcast message informs the receiving entities about the identity of the dynamically chosen media mixer 108 for the call. The media mixer determination module 324 in the receiving entities receives this message and determines the identity of the media mixer 108 from the received message. In one embodiment, the identity of the media mixer 108 is the IP address or the MAC address of the media mixer 108. In yet another embodiment, a media mixer 108 is selected by one or more entity in the conference system 100 based on a selection criterion. The media mixer determination module 324 determines the identity of the selected media mixer 108 based on the same criteria used to select the media mixer 108.

The volume adjuster module 326 is configured to adjust the volume of a selected participant. The volume adjuster module 326 receives the identity of the media mixer 108 from media mixer determination module 324 and transmits a message to the media mixer 108 requesting the media mixer 108 to adjust the volume of the selected participant. In one embodiment, the volume adjuster module 326 also receives the amount of volume to be adjusted. The volume adjuster module 326 transmits the received volume adjustment amount to the media mixer 108. The media mixer module 108 on receiving the volume adjustment message and optionally the volume adjustment amount adjusts the volume of the selected participant before mixing the media from the selected participant with media from other participants. If the media mixer 108 receives a volume adjustment amount, the media mixer 108 adjusts the volume of the selected participant based on the received adjustment amount.

The volume interface module 328 is configured to control the user interface on the endpoint 106 being used to adjust a selected participant's volume. The volume interface module 328 is configured to receive a user selection and a measure of volume adjustment amount for the selected user from endpoint 106. In one embodiment, the volume interface module 328 is also configured to direct the endpoint to render an audio or visual indication informing the user that the volume for the selected user has been adjusted as requested. For example, the endpoint 106 can display the telephone number of the selected user and a corresponding volume bar that indicates the adjusted volume for the selected user.

FIG. 3B is a block diagram illustrating a sidebar module 210 according to one embodiment of the invention. The sidebar module 210 comprises a sidebar controller 312, a media mixer determination module 324, a sidebar media controller 314, and a sidebar interface module 316. These modules are communicatively coupled to each other through a communication bus 311. The communication bus 311 is a communication channel used in the art to transmit and receive electronic signals.

The sidebar controller 312 directs the other modules in sidebar module 210 to execute their respective tasks at appropriate times. The media mixer determination module 324 has been described above.

The sidebar media controller 314 is configured to create, modify and delete various media channels between two entities as required during a call. For example, the side bar media controller 314 requests the media mixer 108 to create a two way media channel between the call agent and the supervisor after a supervisor joins the call in response to the agent's sidebar request. The two ways corresponds to the data from agent to supervisor and the data from supervisor to agent. The side bar media controller 314 is also configured to mute one way of the media channel between the client and the call agent such that the call agent can still hear the client but the client cannot hear the call agent. This muting is helpful when the call agent is conferring with the supervisor and prefers that the client does not hear the agent talking to the supervisor. In one embodiment, the sidebar media controller 314 receives the identity of the determined media mixer 108 from media mixer determination module 324. The sidebar media controller 314 then determines from the received identity the address of the determined media mixer 108 and transmits a request to the determined media mixer 108 to create, modify or delete a particular media channel.

The sidebar interface module 316 is configured to control the user interface on endpoint 106 being used to access the sidebar feature. For example, the sidebar interface module 316 directs the endpoint 106 to render an interface that the agent can use to request a sidebar. In one embodiment, such interface is a soft button displayed on endpoint 106. In another embodiment, the interface also includes the option to mute the client or the supervisor after the supervisor has joined the call. In yet another embodiment, the user interface includes a symbol representing a sidebar session in progress.

Figures 3C, 3D:
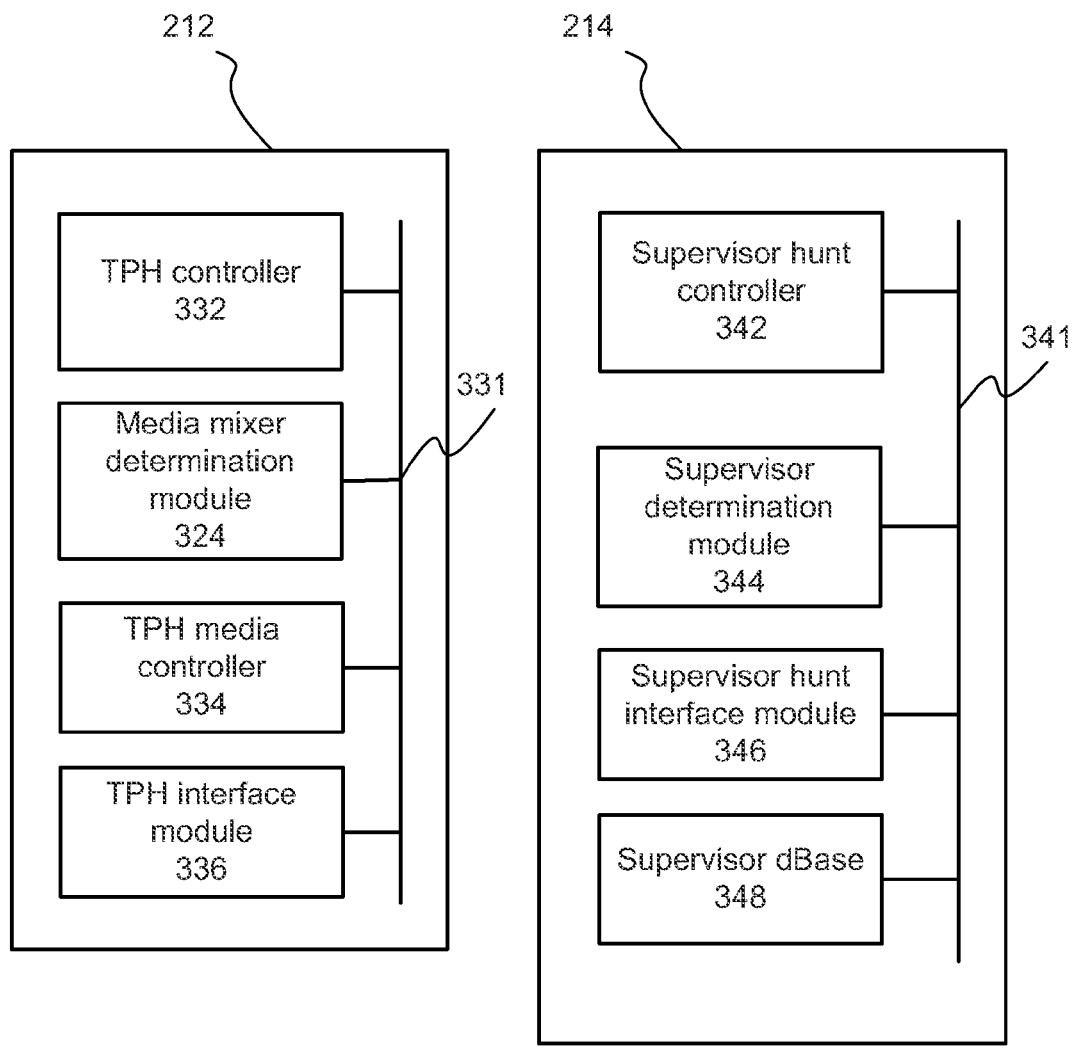
FIG. 3C is a block diagram illustrating a third party hold (TPH) module according to one embodiment of the invention.
FIG. 3D is a block diagram illustrating a supervisor hunt module according to one embodiment of the invention.

FIG. 3C is a block diagram illustrating a third party hold (TPH) module 212 according to one embodiment of the invention. The TPH module 212 comprises a TPH controller 332, a media mixer determination module 324, a TPH media controller 334, and a TPH interface module 336. These modules are communicatively coupled to each other through a communication bus 331. The communication bus 331 is a communication channel used in the art to transmit and receive electronic signals.

The TPH controller 332 directs the other modules in TPH module 212 to execute their respective tasks at appropriate times. The media mixer determination module 324 has been described above. In one embodiment, the TPH controller 332 is also configured to determine whether the participant requesting to hold a third participant possesses the required permissions to make such a request. Such permissions can either be stored in a database (not shown) residing on endpoint 106 or another entity in the system. The TPH controller 332 is configured to query the permissions database to determine whether the requesting user has the authority to put the third participant on hold.

The TPH media controller 334 is configured to ensure that the participant being held does not receive media from or transmit media to the rest of the call participants. The TPH media controller 334 receives the determined identity of the media mixer 108 from media mixer determination module 324. The TPH media controller 334 then determines the address of media mixer 108 from the received identity. The TPH media controller 334 next transmits to the determined address a request to stop mixing media received from the participant being held and stop transmitting mixed media to the participant being held. The TPH media controller 334 can also include the held participant back into the call after receiving a request to do so. After receiving the request to include the previously held participant, the TPH media controller 334 requests the media mixer 108 to resume mixing media received from the previously held participant and transmitting the mixed media to previously held participant.

The TPH interface module 336 is configured to control on the endpoint 106 part of the user interface being used to access the TPH feature. For example, the TPH interface module 336 receives from endpoint 106 a selected participant to be held. The TPH interface module 336 then directs the endpoint 106 to display a graphical symbol indicating the participant that is being held. The TPH interface module 336 is also configured to receive from endpoint 106 an indication of removing the held participant from hold. After the participant is removed from hold, the TPH interface module 336 is configured to direct the endpoint 106 to render a video or audio indication indicating that the participant is now removed from hold.

FIG. 3D is a block diagram illustrating a supervisor hunt module 214 according to one embodiment of the invention. The supervisor hunt module 214 comprises a supervisor hunt controller 342, a supervisor determination module 344, a supervisor hunt interface module 346 and a supervisor database 348. All these modules are communicatively coupled to each other through communication bus 341. The communication bus 341 is a communication channel used in the art to exchange electronic signals.

The supervisor hunt controller 342 is configured to direct other modules in supervisor hunt module 214 to execute their respective task at appropriate times.

The supervisor determination module 344 is configured to determine a supervisor according to the received criteria. In one embodiment, the supervisor determination module 344 determines the appropriate supervisor by querying supervisor database 348.

The supervisor hunt interface module 346 is configured to receive the search criteria for determining the requested supervisor. In one embodiment, the supervisor hunt interface module 346 is also configured to transmit information about one or more supervisors that meet the search criteria to the requesting endpoint 106. The information about the supervisor comprises supervisor identification, supervisor name, supervisor contact information like supervisor telephone number, supervisor's expertise and whether the supervisor is available or not.

Figure 3E:
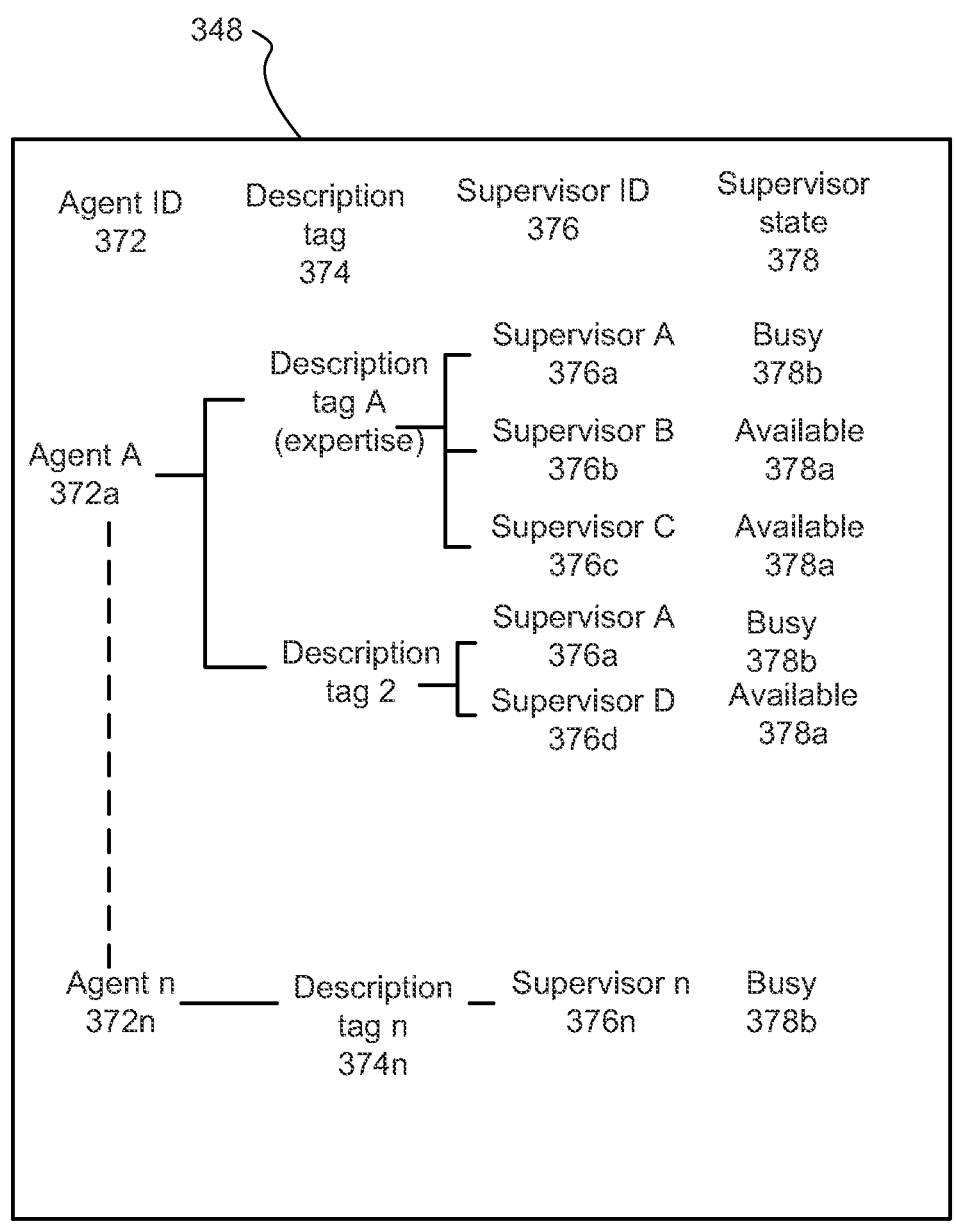
FIG. 3E is a block diagram illustrating a supervisor database according to one embodiment of the invention.

The supervisor database 348 comprises information about various supervisors. An example of supervisor database 348 is illustrated in FIG. 3E. A supervisor database 348 comprises an agent identification 372, a description tag 374, a supervisor identification 376 and a supervisor state 378. An agent identification 372 is a string assigned to an agent operating an endpoint 106. The agent identification 372 ties various supervisors with an agent. In one embodiment, a set of supervisors are assigned to an agent or a set of supervisors are the preferred supervisors for the agent. The agent identification 372 in such an embodiment is associated with a set of supervisors so that the preferred or the assigned supervisors for an agent can be identified.

One or more description tags 374 are associated with an agent or a supervisor. A description tag 374 is any tag describing a characteristic of an agent or a supervisor. For example, a description tag can be agent's or supervisor's field of expertise, field in general, the types of problems handled by the agent or the supervisor etc.

A supervisor identification 376 is a string that identifies a particular supervisor. An association between the description tag 374 and supervisor identification 376 is helpful in querying supervisors that can supervise an agent regarding an issue related to the description tag 374. The supervisor state 378 identifies the current state of the supervisor. Examples of supervisor state 378 include busy and available. In one embodiment, the supervisor determination module 344 queries for only those supervisors whose state is currently available. The supervisor state 378 is helpful in such embodiments.

In one embodiment, a database administrator associates a particular description tag 374 with one or more supervisors. In another embodiment, the database administrator also associates the description tag 374 with one or more agents. Accordingly, the administrator creates an association between the supervisors and agents sharing the same tag. Alternatively, the database administrator associates a supervisor identification 376 to one or more agent identification 372 based on the supervisor's and/or agent's department, subject expertise or seniority. These associations are stored in supervisor database 348 and these associations can be used to create an associated supervisor list for a particular agent identification 372. These associations can be modified anytime by the administrator or another user with appropriate permissions.

In another embodiment, the agent associated with an agent identification 372 creates her own list of preferred supervisors. In this embodiment, the agent can specify association between her agent identification 372 and identification of one or more supervisors. Alternatively, the agent can select one or more supervisor identifications 376 to be associated with the agent's identification 372 based on the supervisor's and/or agent's department, subject expertise or seniority. These associations are also stored in supervisor database 348. The stored associations between the agents and the supervisors can be used to search for an associated supervisor when the agent requests for a supervisor.

Figures 3F, 3G:
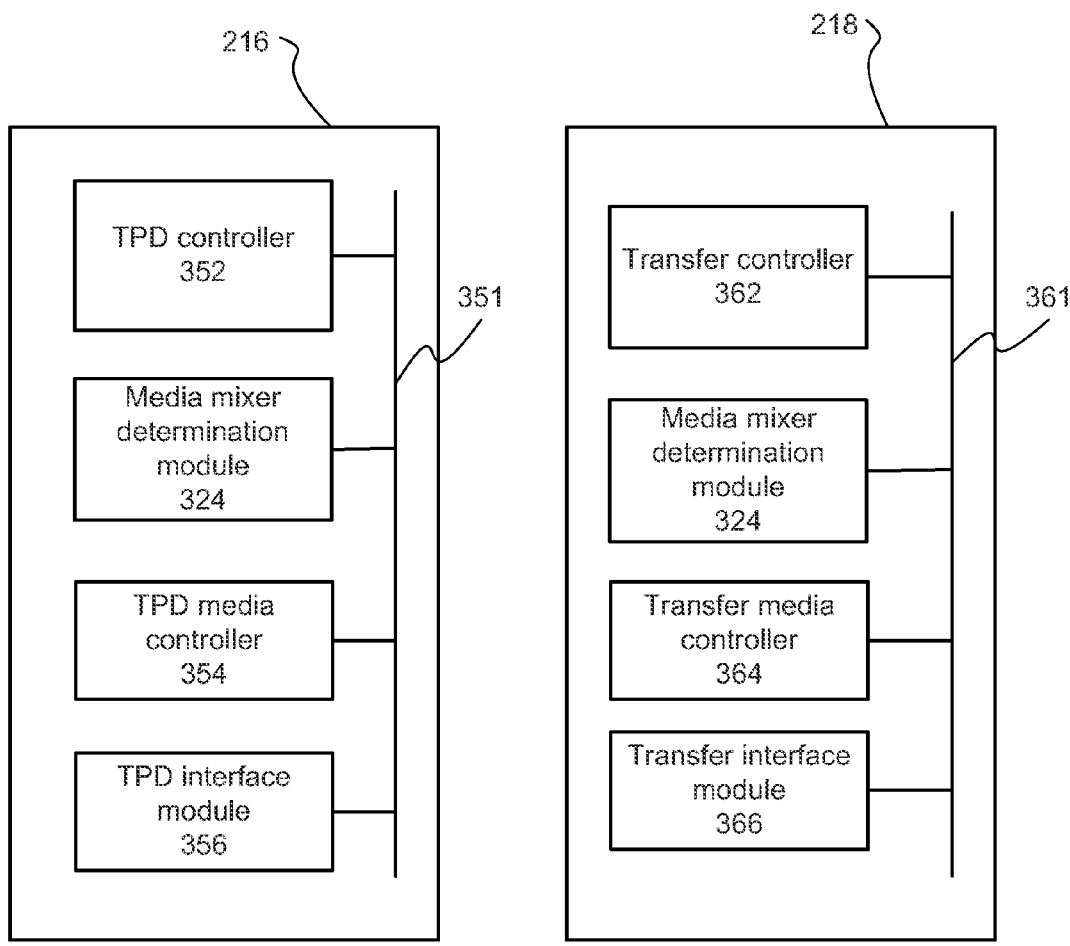
FIG. 3F is a block diagram illustrating a third party disconnect (TPD) module according to one embodiment of the invention.
FIG. 3G is a block diagram illustrating a transfer module according to one embodiment of the invention.

FIG. 3F is a block diagram that illustrates a third party disconnect (TPD) module 216 according to one embodiment of the invention. The TPD module 216 comprises a TPD controller 352, a media mixer determination module 324, a TPD media controller 354 and a TPD interface module 356. All these modules are communicatively coupled to each other through a communication bus 351. Communication bus 351 is a communication channel used in the art to exchange electronic signals.

The TPD controller 352 is configured to direct other modules TPD module 216 to execute their tasks at appropriate times. The media mixer determination module 324 has been described above. In one embodiment, the TPD controller 352 is also configured to determine whether the participant requesting to disconnect a third participant possesses the required permissions to make such a request. Such permissions can either be stored in a database (not shown) residing on endpoint 106 or another entity in the system. The TPD controller 352 is configured to query the permissions database to determine whether the requesting participant has the authority to disconnect the third participant.

The TPD media controller 354 is configured to disconnect the third participant's media from a conference call. The TPD media controller 354 receives the identity of media mixer 108 for the call from media mixer determination module 324. The TPD media controller 354 then determines the address of media mixer 108 from received identity and transmits a request to media mixer 108. The request informs the media mixer 108 to stop mixing media from the participant being disconnected and stop transmitting the mixed media to the participant.

The TPD interface module 356 is configured to receive from requesting endpoint 106 a request to disconnect a selected participant from a call. The TPD interface module 356 is also configured to direct the endpoint to render an audio or visual indication informing the user that the selected participant has been disconnected.

FIG. 3G is a block diagram that illustrates a transfer module 218 according to one embodiment of the invention. The transfer module 218 comprises a transfer controller 362, a media mixer determination module 324, a transfer media controller 364 and a transfer interface module 366. All these modules are communicatively coupled to each other through communication bus 361. The communication bus 361 is a communication channel used in the art to exchange electronic signals.

The transfer controller 362 is configured to direct other modules in transfer module 218 for executing their tasks at appropriate times. The media mixer determination module 324 has been described above.

The transfer media controller 364 is configured to ensure that the media connections are properly created, modified or deleted when a call comprising a client and a supervisor is transferred from a previous agent to a new agent. The transfer media controller 364 receives the identity of the media mixer 108 for the call from media mixer determination module 324. The transfer media controller 364 then determines the address of media mixer 108 from received identity and transmits a request to media mixer 108. The request informs the media mixer 108 to create a media connection with the new agent. This media connection is configured to receive media data from the new agent and transmit the mixed media data from the media mixer 108 to the new agent. The mixed media data includes media data from the client, supervisor or the new agent. In one embodiment, the transfer media controller 364 determines that the endpoint 106 of previous agent was also the media mixer 108 for the conference call between the client, the supervisor and the previous agent. In this embodiment, the transfer media controller 364 requests the endpoint 106 of the new agent to create media connections with the endpoints 106 of client and the supervisor. These media connections are configured to transmit and receive media from the endpoints 106 of the client and the supervisor. Additionally, the transfer media controller 364 requests the endpoint 106 of the new agent to mix the media for the call.

The transfer interface module 366 is configured to receive a request to transfer a call to a new call agent. Additionally, the transfer interface module 366 is configured to direct the requesting endpoint 106 to render an audio or visual indication informing the user that the call has been transferred.

Feature Methods

Figure 4:
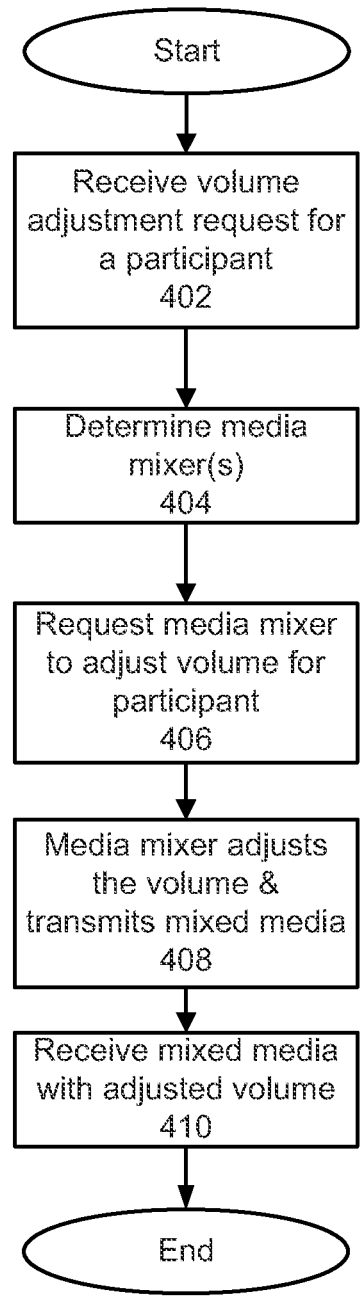
FIG. 4 is a flow chart illustrating a method for controlling volume of a particular call participant according to one embodiment of the invention.

FIG. 4 is a flow chart illustrating a method for controlling volume of a particular call participant according to one embodiment of the invention. During a conference call with two or more participants, a requesting participant selects on their endpoint 106 another call participant and adjusts the volume for the selected participant.

Figure 10A:
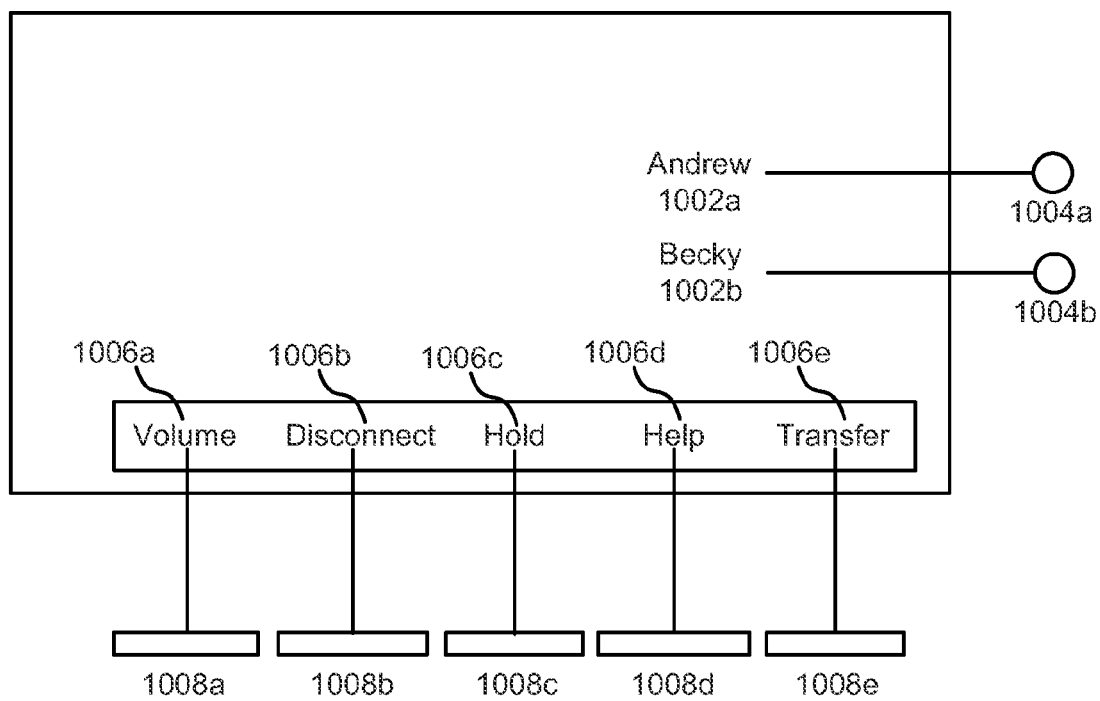
FIGS. 10A-E are block diagrams that illustrate the endpoint interface accessed by an endpoint user to select various call features according to one embodiment of the invention.

FIG. 10A is a block diagram illustrating an interface on endpoint 106 that can be used by the requesting participant to adjust the volume of selected participant. In one embodiment, the interface for controlling features on endpoint 106 can be accessed through a call manager client on a computing device other than endpoint 106. Regardless of whether the interface is accessed through endpoint 106 or the call manager, the interface comprises caller fields 1002*a-b*, caller keys 1004*a-b* for selecting the call participants, call features 1006*a-e* and corresponding feature keys 1008*a-e*. The interface in this figure comprises two callers, two corresponding caller keys, five call features and five corresponding feature keys. One of ordinary skill in the art would understand that the number of participants, number of features and the corresponding keys may vary in other embodiments of the illustrated interface.

The caller fields 1002*a-b* display information about the call participants other than the requesting participant using the endpoint 106. For example, the caller fields can display the name of participants, phone number of the participant, a string of characters identifying the call participants or an image identifying the call participants.

Keys 1004*a-b* are means for selecting a corresponding caller field 1002. The keys 1004*a-b* can be softkeys, buttons, audio receivers that allow the user to select the caller field 1002. The user may touch a softkey 1004, press a button 1004 or voice a command in the audio receiver 1004 to access a caller field 1002.

Features 1006*a-e* are selectable feature that are supported by a call. For example, volume 1006*a* feature can be selected to adjust the volume of a selected participant. Similarly, disconnect 1006*c* feature can be selected to disconnect a participant, hold 1006*c* feature can be selected to put a selected participant on hold, help 1008*d* feature can be selected to seek help from a supervisor and transfer 1006*e* feature can be selected to transfer a call to another caller.

Figure 10B:
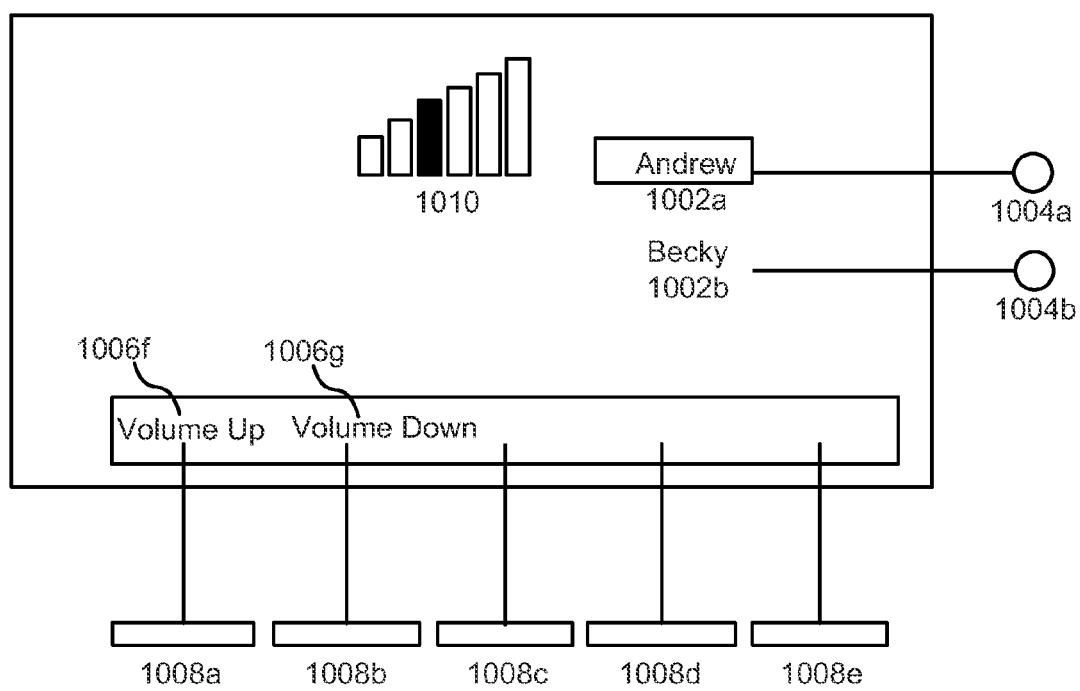

To adjust the volume for call participant Andrew, a requesting participant selects call participant Andrew 1002*a* by selecting the corresponding key 1004*a* and selects the volume 1006*a* feature. As a result, the volume controller 322 directs the endpoint 106 to display the interface illustrated in FIG. 10B. FIG. 10B illustrates an interface similar to the interface of FIG. 10A. In FIG. 10B Andrew 1002*a* is highlighted and the highlight signifies that Andrew 1002*a* has been selected. Additionally, a volume level 1010 is displayed next to selected Andrew 1002*a*. The volume level 1010 represent the volume level for Andrew heard by the requesting participant. Unlike FIG. 10A, the features now displayed in interface of FIG. 10B are volume up 1006*f* and volume down 1006*g*. These features when selected through corresponding keys 1008*a* and 1008*b* increase or decrease Andrew's volume as heard by the requesting participant.

Referring to FIG. 4, the requesting participant selects volume up 1006*f* or volume down 1006*g* on endpoint 106. Consequently, the volume controller 322 in requesting participant's endpoint 106 receives 402 through volume interface module 208 a request to adjust the volume of the selected participant (for e.g. Andrew 1002*a*). The volume controller 322 queries the media mixer determination module 324 and determines 404 the media mixer 108 that is mixing the media for the call. In one embodiment, the endpoint 106 is itself the media mixer 108. In another embodiment, another entity in the conference system 100 is the media mixer 108. Regardless of the entity determined to be the media mixer 108, the volume controller 322 through volume adjuster module 326 requests 406 the media mixer 108 to adjust the volume of the selected participant. The media mixer 108 receives the request and adjusts 408 the volume of the selected participant.

The media mixer 108 then mixes the adjusted media from the endpoint 106 of the selected participant with media from endpoints 106 of other call participants. Next, the media mixer 108 transmits the mixed media to endpoints 106 of call participants. In one embodiment, the same mixed media with the adjusted volume for the selected participant is transmitted to the endpoints 106 of requesting participant and other call participants. In another embodiment, the mixed media with the adjusted volume for the selected participant is only transmitted to the requesting participant's endpoint 106. The media mixer 108 in this embodiment prepares two mixed media streams: one with the selected participant's adjusted volume and one with the selected participant's not-adjusted volume. The media mixer 108 transmits the mixed media with adjusted volume to the requesting participant's endpoint 106 and the mixed media with the not-adjusted volume to other call participants' endpoints 106.

The volume controller 322 receives 410 the mixed media through interface 204 and the mixed media is rendered for the requesting user of endpoint 106. Additionally, the volume level 1010 on the interface of endpoint 106 adjusts accordingly and displays the adjusted volume level 1010 for the selected participant.

Figure 5:
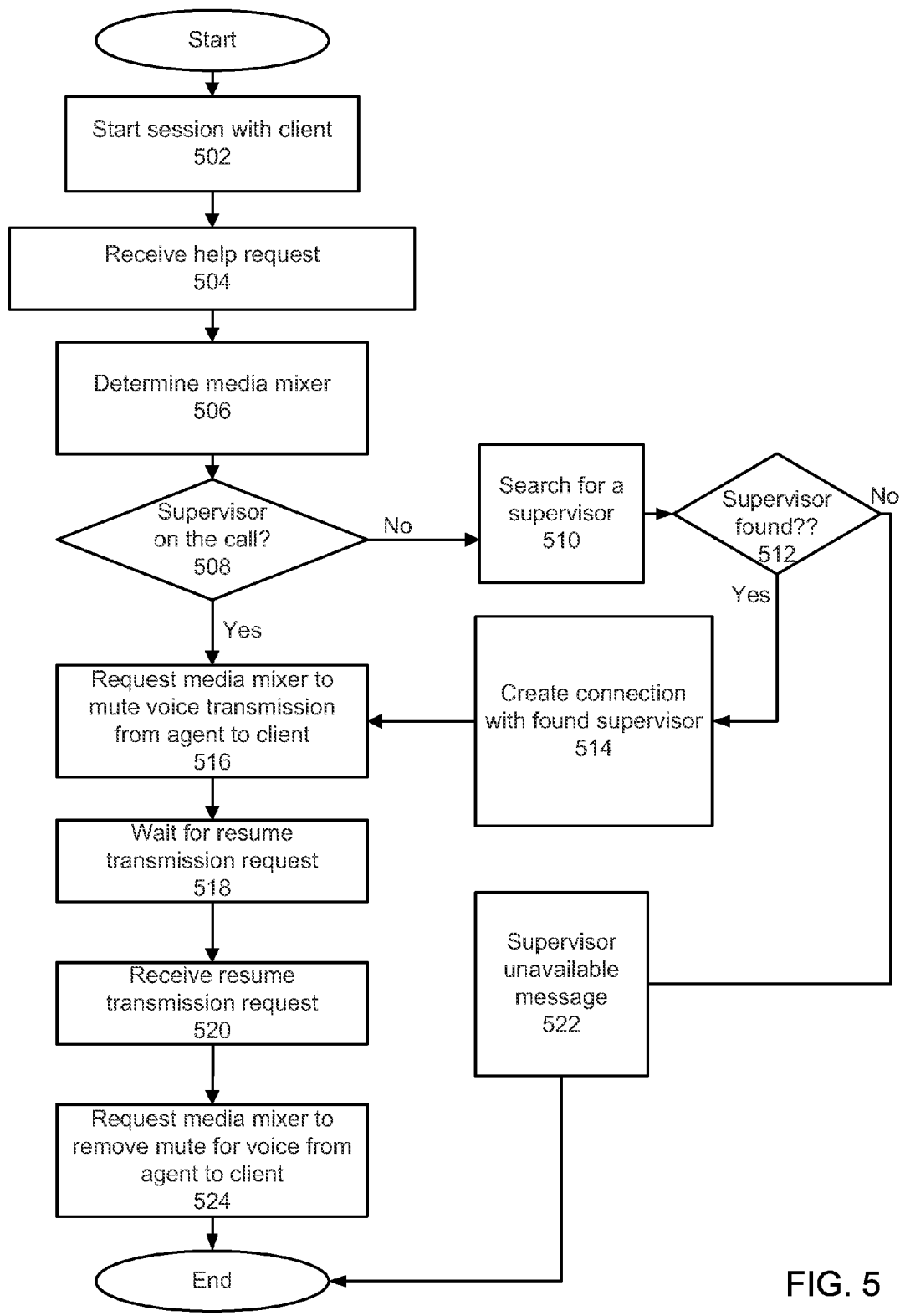
FIG. 5 is a flow chart illustrating a method for executing the sidebar feature during a call according to one embodiment of the invention.
Figure 10C:
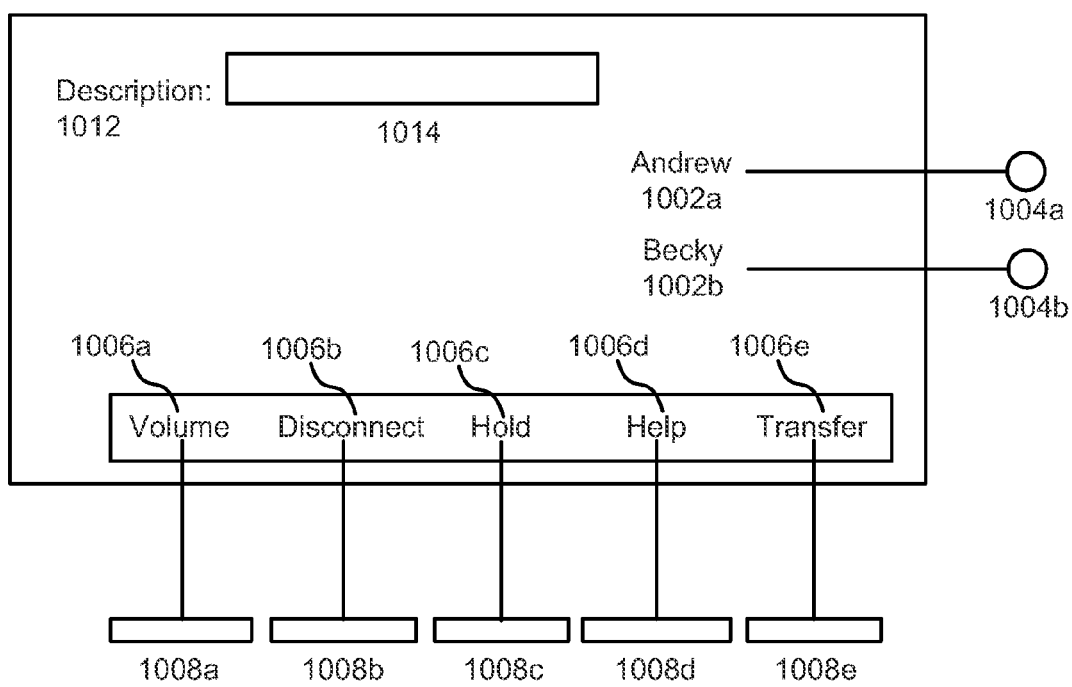

FIG. 5 is a flow chart illustrating a method for executing the sidebar feature during a client call according to one embodiment of the invention. An agent's endpoint 106 starts 502 a session with a client's endpoint 106. During the session, the agent requests a sidebar through an interface on agent's endpoint 106 or the call manager. An example of such an interface is illustrated in FIG. 10A described above. The agent selects feature key 1008*d* to select the help 1006*d* feature. In one embodiment, after the help feature is selected, the sidebar controller 312 directs the endpoint 106 to display on endpoint 106 the interface illustrated in FIG. 10C. In another embodiment, the sidebar controller 312 is communicatively coupled to the call manager and the sidebar controller 312 directs the call manager to display the interface illustrated in FIG. 10C. The interface of FIG. 10C is similar to the interface of FIG. 10A. In addition to elements of FIG. 10A, interface of FIG. 10C includes a description label 1012 and a description input field 1014. The agent inputs in the description input field 1014 a search criteria or a description for the desired supervisor for the sidebar. The agent can use the telephone user interface (not shown) or a graphical user interface (not shown) to enter the description in description input field 1014. After the agent inputs the appropriate information, the sidebar controller 312 in the agent's endpoint 106 receives 504 a help request from the agent.

The sidebar controller 312 through media mixer determination module 324 next determines the identity of the media mixer 108 for the call. As discussed above, the media mixer 108 can be the agent's endpoint 106 or another entity in the conference system 100. The sidebar controller 312 receives the identity of the media mixer 108 and queries the media mixer 108 to determine 508 if the media mixer 108 is already mixing media for a supervisor's endpoint 106. If not, the sidebar controller 312 searches 510 for a supervisor. The method for supervisor search is described below in FIG. 7.

The sidebar controller 312 then determines 512 if a supervisor is found. If not, the sidebar controller 312 through sidebar interface module 316 directs 522 the agent's endpoint 106 to render a message indicating that a supervisor is not available for the call.

Figure 10D:
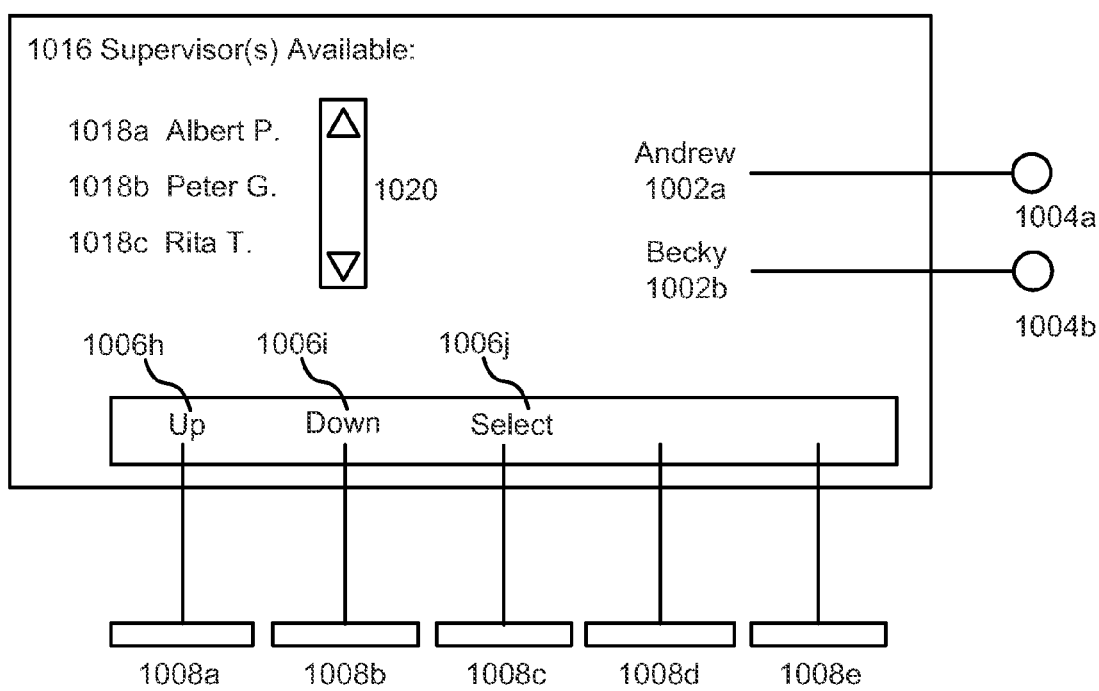

If the supervisor is found, the sidebar controller 312 directs the requesting agent's endpoint 106 or call manager to display the interface illustrated in FIG. 10D. The interface in FIG. 10D is similar to the interface illustrated in FIG. 10A. However, instead of call features 1006*a-e* displayed in interface of FIG. 10A, the interface of FIG. 10D includes features 1006*h-j*. The interface also includes a supervisor(s) available label 1016 and a list of supervisors 1018*a-c* available for the sidebar. Additionally, the interface includes a scroll bar 1020 that displays the navigation through list of available supervisors 1018*a-c*. The agent can navigate up and down the list by selecting the feature key 1008*a* corresponding to up 1006*h* feature or feature key 1008*b* corresponding to down 1006*i* feature. The agent selects one of the available supervisors 1018*c* by selecting the feature key 1008*c* corresponding to the select 1006*j* feature.

The sidebar controller 312 receives the agent's selection and transmits a signal to media mixer 108 directing the media mixer to create a media connection with the selected supervisor's endpoint 106. Consequently, the media mixer 108 creates 514 a media connection with the selected supervisor's endpoint 106. The media mixer 108 can now receive media from supervisor's endpoint 106 on the created media connection and transmit on the media connection mixed media for the conference call to the supervisor's endpoint 106. If, at step 508, the sidebar controller 312 receives from media mixer 108 a message indicating that the media mixer 108 is already mixing media for a supervisor associated with the call, steps 510-514 are skipped.

Figure 10E:
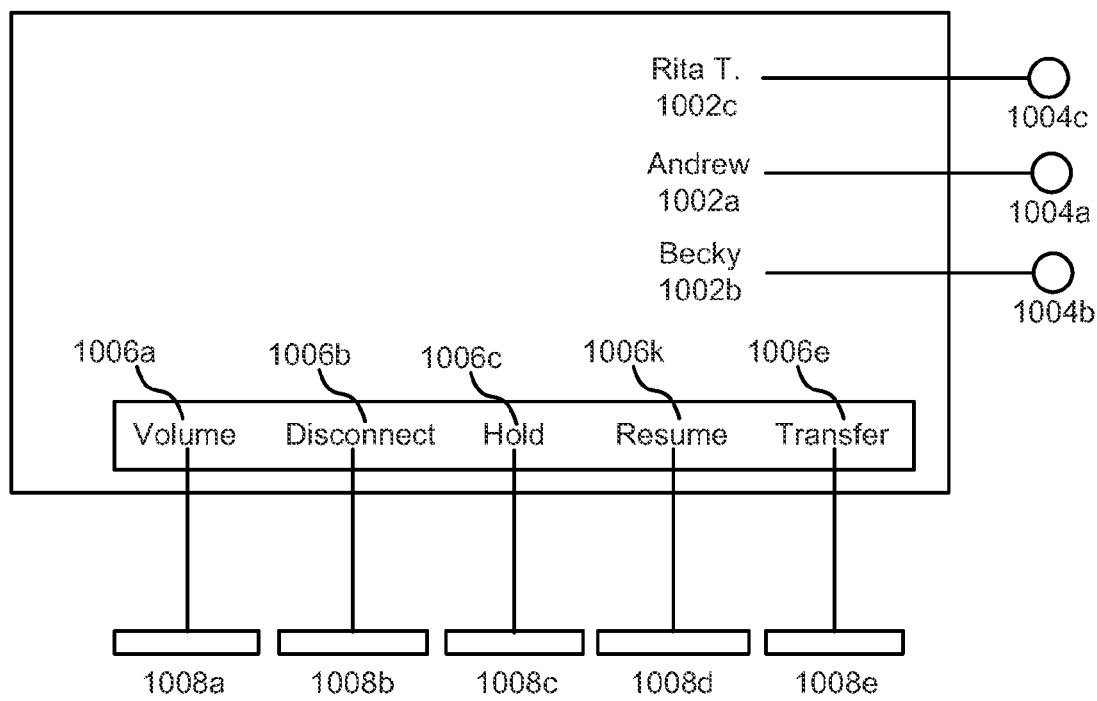

FIG. 10E illustrates an interface displayed on agent's endpoint 106 or the call manager, after the selected supervisor's endpoint 106 is connected to the call. The interface illustrated in FIG. 10E is similar to the interface illustrated in FIG. 10A. In addition to the elements of FIG. 10A, the interface of FIG. 10E includes caller field 1002*c* and corresponding caller key 1004*c*. The additional caller field 1002*c* corresponds to the selected supervisor and informs the agent that the selected supervisor is now connected to the call. Additionally, the help 1006*d* feature is replaced by resume 1006*k* feature. After the agent has consulted with the supervisor, the agent can select the resume 1006*k* feature by selecting the corresponding feature key 1008*d*.

Next, the sidebar controller 312 through sidebar media controller 314 requests 516 the media mixer 108 to mutvoice transmission from agent's endpoint 106 to client's endpoint 106. Consequently, the media mixer 108 stops transmitting the mixed media for the call to client's endpoint 106. In one embodiment, the media mixer 108 transmits mixed media to client's endpoint 106 but the transmitted mixed media does not include media data from agent's endpoint 106 or supervisor's endpoint 106. In either case, as a result of the request, the client cannot hear the agent or the supervisor anymore but the supervisor and the agent can still hear the client.

Until the agent selects the resume 1006*k* feature, the sidebar controller 312 waits 518 to receive a resume transmission request or a request to remove the client from mute. After the agent selects the resume 1006*k* feature, the sidebar controller 312 receives 520 through sidebar interface module 316 the resume transmission request. The sidebar controller 312 then transmits 522 a request signal to media mixer 108 requesting the media mixer to resume transmission to the client. Accordingly, the media mixer 108 resumes transmitting to client's endpoint 106 the mixed media comprising the media from agent's endpoint 106, supervisor's endpoint 106 or client endpoint 106. As a result, the client can now hear the supervisor and the agent.

Figure 6:
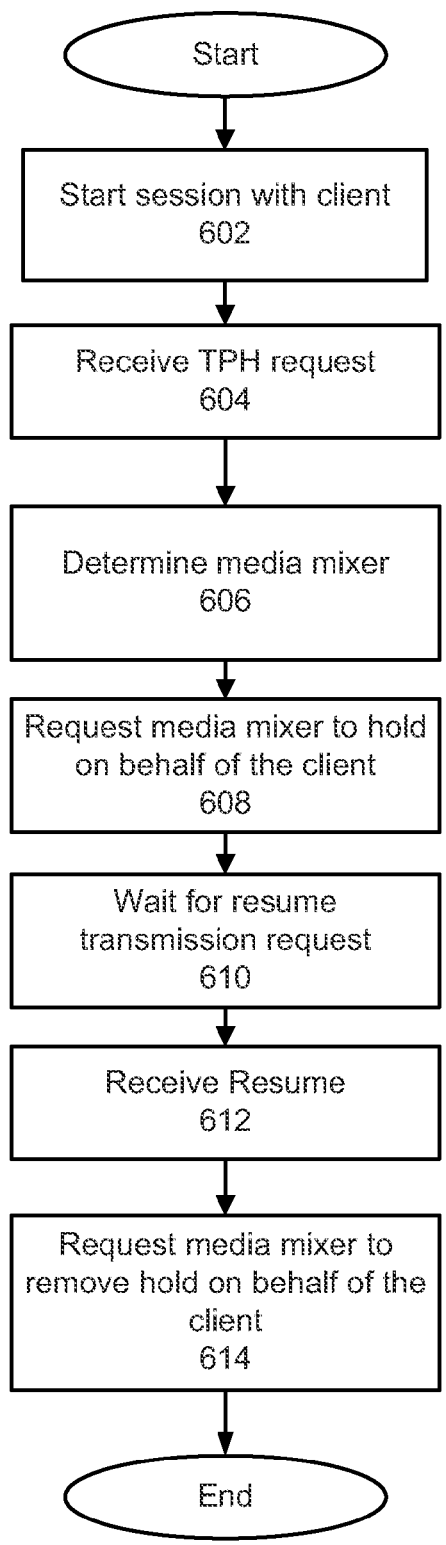
FIG. 6 is a flow chart illustrating a method for executing the third party hold feature according to one embodiment of the invention.

FIG. 6 is a flow chart illustrating a method for executing the third party hold feature according to one embodiment of the invention. During a conference call with an agent, a client and a supervisor, the agent through an interface on endpoint 106, or on call manager, requests to put the client's endpoint 106 on hold. FIG. 10A illustrates an interface displayed on agent's endpoint 106 or on a call manager. To place a call participant on hold, the agent selects Andrew 1002*a* through caller key 1004*a* or Becky 1002*b* through caller key 1002*b* and selects the hold feature 1006*c* through feature key 1008*c*. The TPH controller 332 through TPH interface module 336 in the agent's endpoint 106 receives 604 the agent's request and determines the identity of media mixer 108 for the call. As discussed above, the media mixer 108 can be the agent's endpoint 106 or another entity in the conference system 100. The TPH controller 332 receives the determined identity of media mixer 108 and requests 608 the media mixer 108 to hold on behalf of the client's endpoint 106. Consequently, the media mixer 108 stops mixing the received media from client's endpoint 106 and stops transmitting the mixed media for the call to client's endpoint 106. In one embodiment, the media mixer 108 transmits the mixed media to client's endpoint 106 but the transmitted mixed media does not include media data from agent's endpoint 106 or supervisor's endpoint 106. In either case, as a result of the request, the client cannot hear the agent or the supervisor anymore and the supervisor and the agent cannot hear the client. While the client is on hold, the agent's, supervisor's and client's endpoint 106 display an interface similar to interface in FIG. 10A with the held party 1002*a-b* blinking or visually marked to inform the user that the party 1002 is on hold.

The TPH controller 332 then waits 610 to receive a resume transmission request or a request to remove the client from mute. When the TPH controller 332 receives 612 through TPH interface module 336 the resume transmission request, the TPH controller 332 transmits 612 a request signal to media mixer 108 requesting the media mixer to resume transmission to the client. Accordingly, the media mixer 108 resumes mixing media from the client's endpoint 106 with the media from agent's or supervisor's endpoint 106. The media mixer 108 then transmits to client's endpoint 106, agent's endpoint 106 and supervisor's endpoint 106 the mixed conference call media comprising the media from agent's endpoint 106, supervisor's endpoint 106 or client's endpoint 106. As a result, the client, the agent and the supervisor can all hear each other on their endpoints 106.

Figure 7:
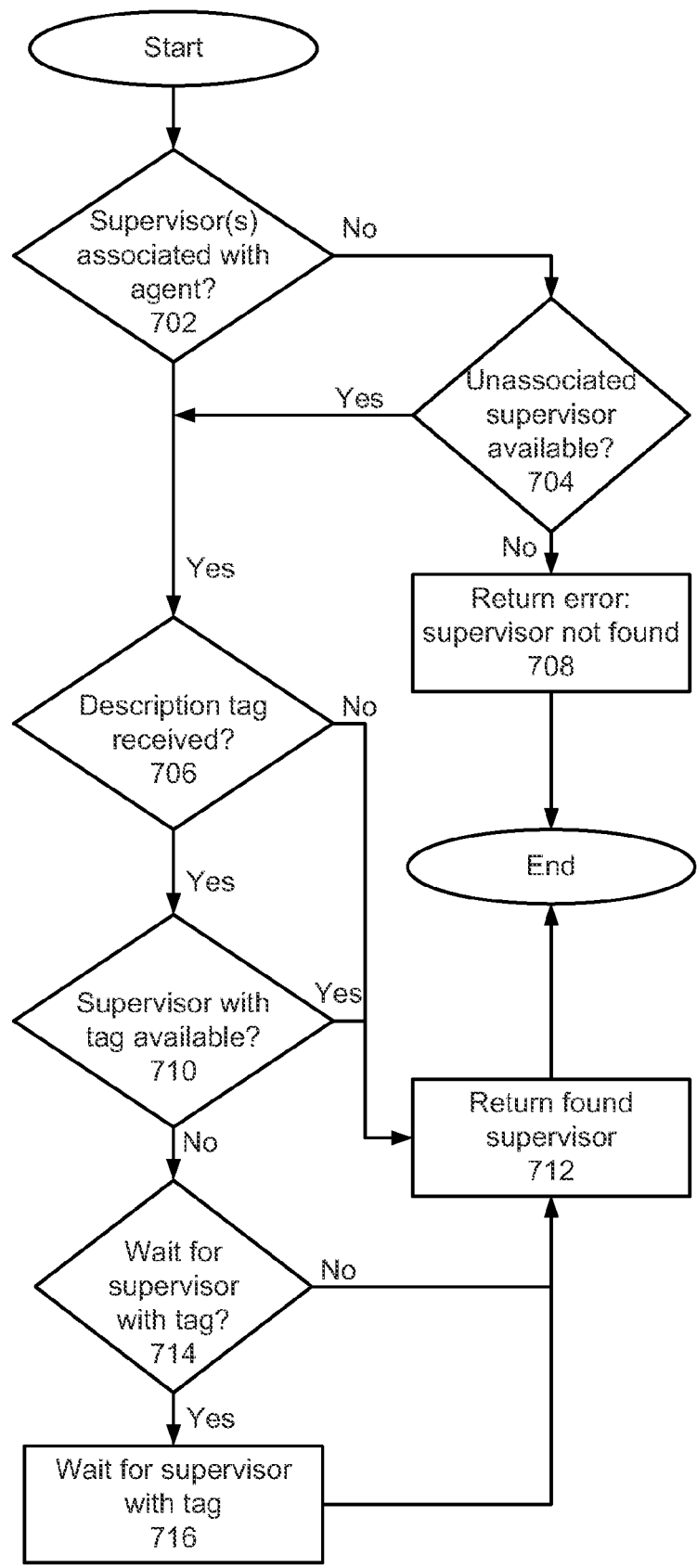
FIG. 7 is a flow chart illustrating a method for searching for an agent's supervisor according to one embodiment of the invention.

FIG. 7 is a flow chart illustrating a method for searching for a supervisor according to one embodiment of the invention. An agent requests for a supervisor through the interface in FIG. 10A. The agent can request for a supervisor while the agent is on the call or while the agent is idle. An example of agent requesting for a supervisor during a call is described above in FIG. 5. If an agent requests for a supervisor while being idle, the agent's endpoint is connected through a new call to the found supervisor's endpoint 106. In addition to an agent requesting for a supervisor, another module in the agent's endpoint 106 can also request the supervisor hunt controller 342 for a supervisor associated with the agent.

Regardless of how the request is received, the supervisor hunt controller 342 through supervisor interface module 346 in the endpoint 106 receives the request and determines 702 if one or more supervisor is associated with the requesting agent. In one embodiment, the supervisor hunt controller 342 receives the agent's identification with the request for supervisor. In another embodiment, the supervisor hunt controller 342 receives agent's identification separate from the supervisor request. Regardless of how agent's identification is received, the supervisor hunt controller 342 through supervisor determination module 344 queries the supervisor database 348 to determine the supervisor associated with the agent's identification. In one embodiment, the supervisor determination module 344 queries the preferred supervisor list created by the agent in supervisor database 348. If an associated supervisor is not found in the preferred list, the supervisor determination module 344 queries the supervisor list created by the administrator in supervisor database 348.

If no supervisors are associated with the agent's identification, the supervisor hunt controller 342 through supervisor determination module 344 queries supervisor database 348 and determines 704 whether any supervisor is available to help the agent. In one embodiment, to determine any available supervisors, the supervisor determination module 344 queries supervisor database 348 and searches for supervisors whose current state is available.

If none of the supervisors are available, the supervisor hunt controller 342 transmits 708 through supervisor hunt interface module 346 an error signal to agent's endpoint 106. The error signal directs the agent's endpoint 106 to render an audio or visual message informing the agent that no supervisor is available for help. In one embodiment, the supervisor hunt controller 342 queries the supervisor database 348 again for a supervisor after a pre-configured time period. In another embodiment, the supervisor hunt controller 342 receives from supervisor database 348 one or more supervisor identifications 376 for supervisors that are not currently available. Consequently, the supervisor hunt controller 342 transmits a message to the endpoints 106 associated with the received one or more supervisor identifications 376. The supervisors receive the message through their endpoints 106 and follow up with the requesting agent at appropriate time.

If at step 704, an unassociated supervisor is found, or if at step 702, an associated supervisor is found, the supervisor hunt controller 342 determines 706 if a description tag was received with the request for supervisor. If a description tag was not received with the supervisor request, the supervisor hunt controller 342 returns 712 the associated supervisor to the requesting module. In one embodiment, more than one supervisor is found at step 702 or step 704. In this embodiment, the supervisor hunt controller 342 determines one supervisor from the plurality of found supervisors based on the supervisor's seniority, expertise or another characteristic that is optionally stored in supervisor database 348.

If, at step 706, a description tag was received, the supervisor hunt controller 342 through supervisor determination module 344 queries the supervisor database 348 to determine 710 if a supervisor associated with the received tag is available. If yes, the supervisor hunt controller 342 returns the available supervisor associated with the description tag to the requesting module. In one embodiment, more than one supervisor is associated with the received tag and is available. In this embodiment, the supervisor hunt controller 342 determines one supervisor from the plurality of available supervisors based on the supervisor's seniority, expertise or another characteristic that is optionally stored in supervisor database 348.

Otherwise, the supervisor hunt controller 342 determines 714 if the request specified whether or not to wait for a supervisor associated with a received tag. In one embodiment, the supervisor controller 342 through supervisor hunt interface module 344 directs the endpoint 106 to render a message inquiring whether or not to wait for a supervisor associated with the requested tag. In either case, the supervisor hunt controller 342 determines 714 whether to wait for a supervisor with the requested tag. If not, the supervisor hunt controller 342 returns 712 information about the available supervisor associated with the agent's identification. Otherwise, the supervisor hunt controller 342 waits 716 for the supervisor associated with the requested description tag and once such a supervisor is available, the supervisor hunt controller 342 returns 712 the found supervisor to the requesting module.

Figure 8:
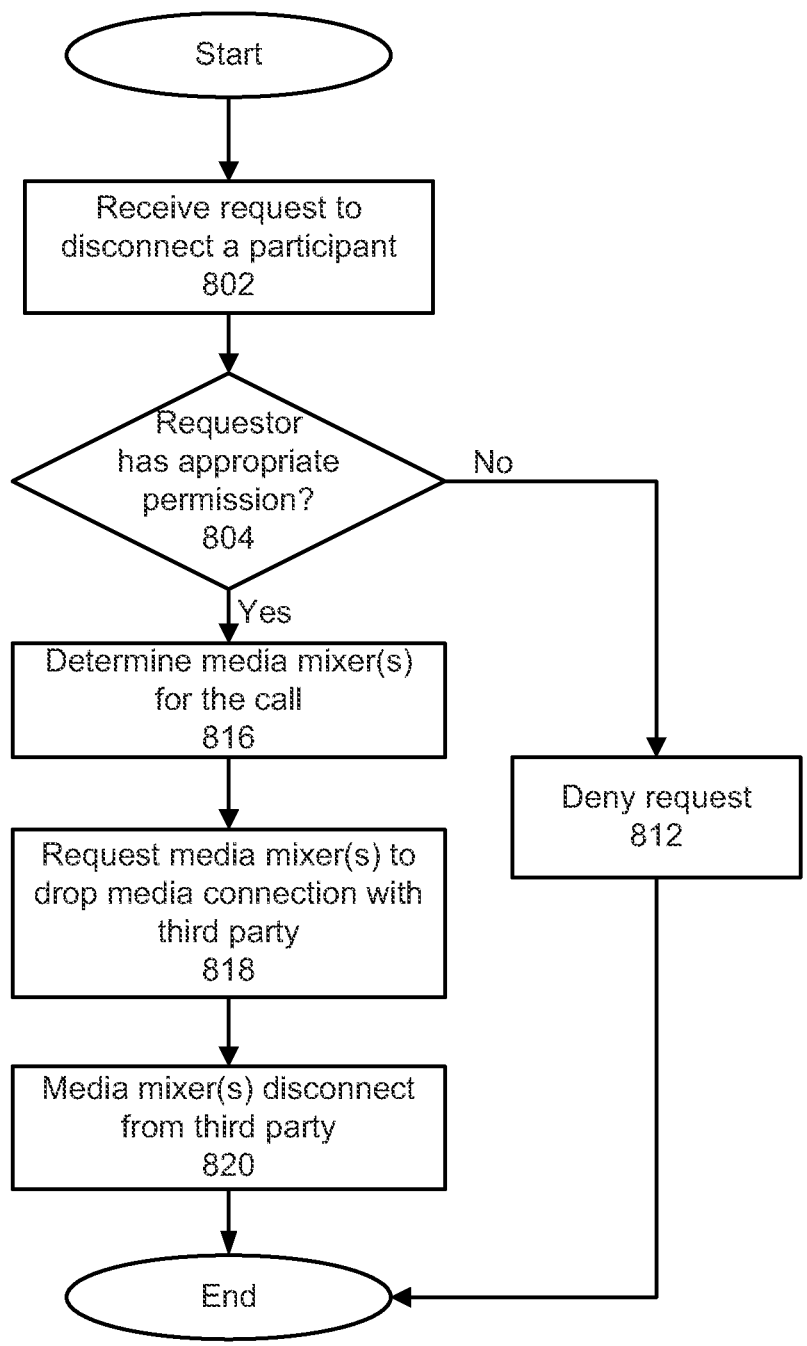
FIG. 8 is a flow chart illustrating a method for executing the third party disconnect feature according to one embodiment of the invention.

FIG. 8 is a flow chart illustrating a method for executing the third party disconnect feature according to one embodiment of the invention. The agent or the supervisor through their corresponding endpoints 106, or call manager, request a selected call participant's endpoint 106 to be disconnected from the call. FIG. 10A illustrates an interface displayed on agent's or supervisor's endpoint 106. To disconnect a third party, for example Andrew, the agent or the supervisor selects Andrew 1002*a* through caller key 1004*a* and selects the disconnect feature 1006*c* through feature key 1008*c*.

The TPD controller 352 receives 802 the request through TPD interface module 356. The request comprises an identification of the participant to be disconnected. In one embodiment, the request also comprises the identification of the participant requesting the other participant to be disconnected. The TPD controller 352 next determines 804 if the requesting participant has the appropriate permission to disconnect another participant. This determination can be made by querying a database (not shown) that includes the permission assigned to various participants of the call.

If the requesting participant does not have the required permissions, the TPD controller 352 denies 812 the request and transmits a denial signal to requesting participant's endpoint 106 through TPD interface module 356. The denial signal directs the endpoint 106 to render an audio or visual message informing the requesting participant that the request has been denied.

On the other hand, if the TPD controller 352 determines that the requesting user has the appropriate permissions, the TPD controller 352 through media mixer determination module 324 determines 806 the media mixer 108 for the call. Next, the TPD controller 352 through TPD media controller 354 requests 808 the media mixer 108 to delete the media connection between the media mixer 108 and the endpoint 106 of the disconnecting participant. Consequently, the media mixer 108 deletes 810 the media connection to and from endpoint 106 of disconnecting participant.

Figure 9:
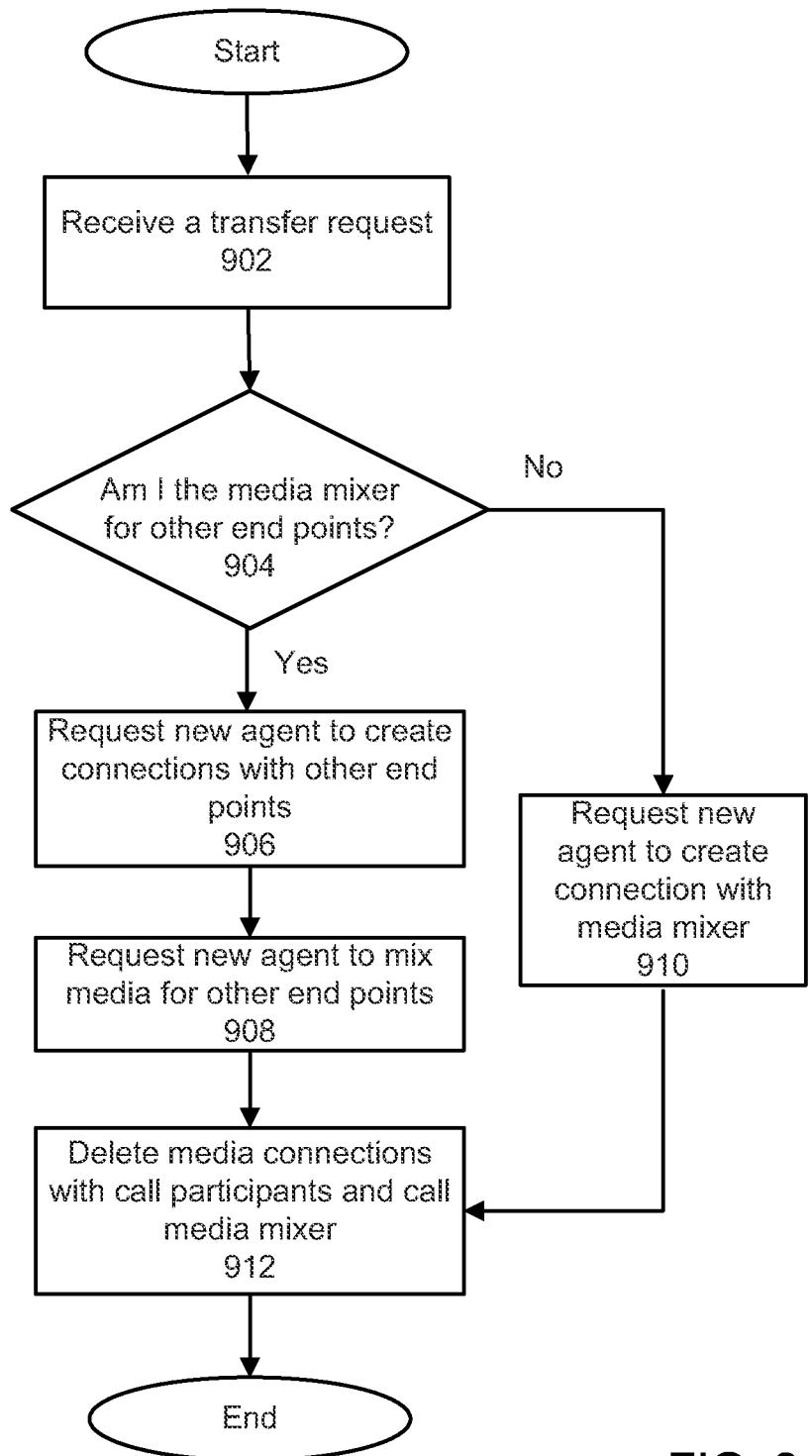
FIG. 9 is a flow chart illustrating a method for transferring a call with more than one call participant from one call agent to another call agent according to one embodiment of the invention.

FIG. 9 is a flow chart illustrating a method for transferring a call with more than one call participant from one call agent to another call agent according to one embodiment of the invention. A first call agent makes a request through an endpoint 106, or a call manager, for transferring the call with a supervisor and a client to a second call agent.

FIG. 10A illustrates an interface displayed on the first call agent's endpoint 106 or the call manager. To transfer the call, the first call agent selects the transfer feature 1006e through feature key 1008e. The transfer controller 106 in first call agent's endpoint 106 receives 902 the request, and the received request includes the identification of the second call agent. In one embodiment, the identification is a phone number. In another embodiment, the received identification is a name or a string that identifies the second agent. The transfer controller 362 through media mixer determination module 324 determines the identity of media mixer 108 for the call.

Next, the transfer controller 362 determines 904 if the identity of the first agent's endpoint 106 is the same as the determined identity of the media mixer 108. If not, the transfer controller 362 through transfer media controller 364 requests 910 the second agent's endpoint 106 to create a connection with the call's media mixer 108. In one embodiment, the transfer controller 362 also requests the second agent's endpoint 106 to request additional data related with the call from the first call agent's endpoint 106 or another entity system 100 that manages the additional call data. Examples of additional call data include information about the supervisor or the client on the call. Accordingly, the second agent's endpoint requests and receives the additional data. In another embodiment, the transfer controller 362 requests the first call agent's endpoint 106 or another entity in system 100 that manages additional call data to transmit the additional call data to the second call agent's endpoint. Accordingly, the first call agent's endpoint 106 or the other entity managing the additional call data transmits the additional call data to second call agent's endpoint 106.

Next, the transfer controller 362 through transfer media controller 364 deletes 912 the media connections between endpoints 106 of other call participants or media mixer 108 for the call and first agent's endpoint 106.

If the transfer controller 362, at step 904, determines that the first agent's endpoint 106 is the media mixer 108 for the call, the transfer controller 362 requests 906 the second agent's endpoint 106 to assume the role of the media mixer 108. Accordingly, the transfer controller 362 requests 906 the second agent's endpoint 106 to create media connections with endpoints 106 of other call participants and requests 908 the new agent to mix media for other call participants. In one embodiment, as discussed above, the second call agent's endpoint 106 also receives additional call data from the first agent's endpoint 106 or another entity in system 100. Next, the transfer controller 362 through transfer media controller 364 deletes the media connections between endpoints 106 of other call participants or media mixer 108 for the call and first agent's endpoint 106. After the media connections are deleted, the transfer of the call with the client and the supervisor from the first agent to second agent is complete.

What is claimed is:

1. A computer-implemented method comprising:

during a conference call between a first participant on a first endpoint, a second participant on a second endpoint and a third participant on a third endpoint, receiving a third party disconnect (TPD) request for disconnecting the third endpoint from the conference call from a requesting participant, wherein the TPD request comprises an identification of the third endpoint, the requesting participant is the first participant or the second participant; and determining permissions associated with the requesting participant based on a query of a database that includes permissions associated with participants in the conference call, and based on the permissions associated with the requesting participant:

denying the TPD request if the permissions do not authorize the requesting participant to make the TPD request; and if the permissions authorize the requesting participant to make the TPD request:

determining an identification of a media mixer for the conference call;

sending a request to the media mixer to disconnect a media connection between the media mixer and the third endpoint; and disconnecting the third endpoint from the conference call.

2. The method of claim 1, further comprising:

receiving a volume adjustment amount from the second endpoint; and transmitting the volume adjustment amount to the media mixer, wherein the media mixer adjusts the volume of the media from the first participant based on the volume adjustment amount.

3. The method of claim 1, further comprising:

receiving a sidebar request from the second endpoint for a sidebar between the second endpoint and a supervisor endpoint; and muting voice transmission from the second endpoint and the supervisor endpoint to the third endpoint.

4. The method of claim 3, further comprising:

determining an appropriate supervisor endpoint for the sidebar with the second endpoint by querying a supervisor database.

5. The method of claim 1, further comprising:

receiving a third party hold (TPH) request for putting the third endpoint on hold, the TPH request originating from an endpoint other than the third endpoint; and muting voice transmission to and from the third endpoint.

6. The method of claim 5, further comprising:

receiving a resume request to remove the third endpoint from hold, the resume request originating from an endpoint other than the third endpoint; and resuming the voice transmission to and from the third endpoint.

7. A computer-implemented method comprising:

during a conference call between a first participant on a first endpoint, a second participant on a second endpoint and a third participant on a third endpoint, receiving a third party hold (TPH) request from a requesting participant for putting the third endpoint on hold, wherein the TPH request comprises an identification of the third endpoint, and wherein the requesting participant comprises the first participant or the second participant;

determining permissions associated with the requesting participant based on a query of a database that includes permissions associated with participants in the conference call;

based on the permissions associated with the requesting participant:
  denying the TPH request if the permissions do not authorize the requesting participant to make the TPH request; and
  if the permissions authorize the requesting participant to make the TPH request:
    determining an identification of a given media mixer for the conference call;
    sending a request to the given media mixer to mute transmission between the first endpoint and the second endpoint to the third endpoint;
    establishing a new media mixer for the third endpoint while the transmission between the first endpoint and the second endpoint to the third endpoint is muted; and
    sending a resume request to the given media mixer in response to an indication from the requesting party; and
    in response to the resume request, moving the third endpoint from the new media mixer to the given media mixer for the conference call.

8. The method of claim 7 wherein the first endpoint is the given media mixer and the first endpoint transmits a request to a fourth endpoint to function as the new media mixer.

9. The method of claim 7 further comprising transmitting a volume adjustment signal to the given media mixer, the volume adjustment signal comprising a request to adjust volume of media from the first participant; and adjusting the volume of the media from the first participant based on the volume adjustment amount.

10. The method of claim 7, further comprising:
receiving a third party disconnect (TPD) request for disconnecting the third endpoint from the conference call, the TPD request originating from an endpoint other than the third endpoint; and
deleting media connections to and from the third participant, the media connection comprises the first media connection or the third media connection.

11. The method of claim 10, further comprising:
determining whether the requesting participant requesting the third party disconnect (TPD) request is authorized to make the TPD request; and
denying the TPD request if the requesting participant is not authorized to make the TPD request.

12. A computer-implemented method comprising:
receiving a request for a supervisor associated with an agent engaged in a call with a client, wherein the request for the supervisor includes a search criterion and an identification of the agent;
querying a supervisor database based on the search criterion, the supervisor database storing information about various supervisors;
identifying at least two supervisors satisfying the search criterion;
selecting a supervisor from the at least two supervisors based on the received identification of the agent and based on one or more of a seniority of the supervisor, an expertise of the supervisor, or other characteristic stored in the supervisor database;
establishing a conference call between the agent at a first endpoint, the supervisor at a second endpoint, and the client at a third endpoint;
during the conference call, receiving a third party request from a requesting participant, wherein the requesting participant is one of the agent, the supervisor, and the client;
determining permissions associated with the requesting participant based on a query of a database that includes permissions associated with participants of the conference call;
based on the permissions associated with the requesting participant:
  denying the third party request if the permissions do not authorize the requesting participant to make the third party request; and
  if the permissions authorize the requesting participant the third party request to make the third party request, employing a media mixer associated with the conference call to perform the third party request.

13. The method of claim 12, further comprising:
receiving a volume adjustment amount from the agent or the supervisor; and
transmitting the volume adjustment amount to the media mixer, wherein the media mixer adjusts the volume of the media from the client based on the volume adjustment amount.

14. The method of claim 12, further comprising:
receiving a sidebar request from the agent for a sidebar between the agent and the supervisor; and
muting voice transmission from the agent and the supervisor to the client.

15. The method of claim 14, further comprising:
determining an appropriate supervisor endpoint for the sidebar between the agent and the supervisor.

16. The method of claim 12, wherein the third party request is a third party hold (TPH) request for putting the third endpoint on hold, the TPH request originating from the agent or the supervisor; and, based on the permissions, muting voice transmission to and from the client.

17. The method of claim 16, further comprising:
receiving a resume request to remove the client from hold, the resume request originating from the agent or the supervisor; and
resuming the voice transmission to and from the client.

18. The method of claim 12, wherein the third party request is at least one of: a third party hold (TPH) request, and a third party disconnect (TPD) request.

19. The method of claim 18, further comprising interrupting media transmission to and from the client, wherein the requesting participant is one of the agent and the supervisor.

* * * * *